United States Patent [19]

Yoshitani et al.

[11] Patent Number: 5,314,912

[45] Date of Patent: May 24, 1994

[54] SLIDING PROPERTY IMPROVING AGENT AND PROCESS FOR MAKING THE SAME

[75] Inventors: Shouichi Yoshitani, Aichi; Hiroki Mizutani, Handa; Nobuyoshi Suzuki; Kazumine Ohara, both of Aichi; Yasushi Ohyanagi, Tokyo; Isamu Sekiguchi, Sagamihara, all of Japan

[73] Assignee: Nippon Oil and Fats Co., Ltd., Tokyo, Japan

[21] Appl. No.: 7,371

[22] Filed: Jan. 21, 1993

Related U.S. Application Data

[62] Division of Ser. No. 632,380, Dec. 21, 1990, abandoned.

[30] Foreign Application Priority Data

| Dec. 22, 1989 | [JP] | Japan | 1-334474 |
| Jan. 19, 1990 | [JP] | Japan | 2-10111 |
| Feb. 9, 1990 | [JP] | Japan | 2-31174 |
| Feb. 16, 1990 | [JP] | Japan | 2-35268 |
| Mar. 6, 1990 | [JP] | Japan | 2-54179 |
| Mar. 8, 1990 | [JP] | Japan | 2-57379 |
| Mar. 27, 1990 | [JP] | Japan | 2-77997 |
| Apr. 13, 1990 | [JP] | Japan | 2-96210 |

[51] Int. Cl.$^5$ .......................... C08K 3/20; C08K 9/04

[52] U.S. Cl. ........................................ 524/458; 525/309

[58] Field of Search ........................ 524/458; 525/309

[56] References Cited

U.S. PATENT DOCUMENTS

| 4,212,958 | 7/1980 | Falk | 525/310 |
| 4,670,508 | 6/1987 | Ohdaira et al. | 525/64 |
| 4,762,882 | 8/1988 | Okano et al. | 525/74 |
| 4,806,581 | 2/1989 | Walker | 524/178 |
| 4,839,432 | 6/1989 | Moriya et al. | 525/303 |
| 4,879,347 | 11/1989 | Moriya et al. | 525/263 |
| 4,957,974 | 9/1990 | Ilenda et al. | 525/301 |

*Primary Examiner*—Paul R. Michl
*Assistant Examiner*—Edward Cain
*Attorney, Agent, or Firm*—Flynn, Thiel, Boutell & Tanis

[57] ABSTRACT

A sliding property improving agent comprising a multiphase structure thermosplastic resin which consists of a dispersion of 5 to 95 parts by weight of a non-polar α-olefin polymer (a) and 95 to 5 parts by weight of a vinyl polymer (b), with the dispersing polymer having a particle size from 0.001 to 10 μm. A thermoplastic resin containing said resinous agent exhibits excellent mechanical strength, high anti-biasion and improved sliding properties.

3 Claims, No Drawings

SLIDING PROPERTY IMPROVING AGENT AND PROCESS FOR MAKING THE SAME

This application is a division of U.S. Ser. No. 07/632,380, filed Dec. 21, 1990 now abandoned.

BACKGROUND OF THE INVENTION

1. Field of the Invention

This invention relates to a sliding property improving agent which is especially applicable to thermoplastic resins and effectively improves the sliding property of the resins while not negatively affecting other physical properties, mechanical properties and thermal properties thereof. This invention also relates to a process for making the sliding property improving agents. Resins having improved sliding properties through the additional said improved resin of this invention may be widely used in the field of electrical and electromechanical industries, precision machine industries and automobile industries.

2. Prior Art

Resins are widely used in many industrial fields as an alternative for metal materials because of their mechanical and electrical characteristics, productivity, anti-corrosive properties, anti-abrasion properties and their lighter weight.

One of the advantages of using a resin is its sliding property and the resins having self-lubricating properties are in practical use in the fields of the automobile industry, building industry and electrical industry. Both thermoplastic resins and thermosetting resins are used where sliding properties are required, and thermoplastic resins are especially widely used because of the ease and economics of that fabrication.

Recently, a requirement of improved sliding properties has increased as the area of use of the resin expands.

Attempts have been made to improved the sliding properties of resins and it has been well known as a method of improving sliding properties of resins to add a solid or a liquid luburicant thereto.

The following are some examples of various kind of resins having improved sliding properties by the addition of lubricants or various resins.

Japanese laid open 87-253650 (Kokai Sho 62-253650) and 88-37198 (Kokai Sho 63-37198) disclose a composition for improving the sliding properties of a polyoxymethylene resin comprising a poly-acetal polyethylene with a specific MI (melt index) and a conductor which reduces the coefficient of friction and noise while sliding.

Japanese laid open 88-33465 (Kokai Sho 63-33465) discloses a polyoxymethylene resin composition procduced by uniformly dispersing a ultra high molecular weight fine polyethylene powder having high moldability properties, anti-friction properties and anti-abrasion properties.

Japanese laid open 85-144351 (Kokai Sho 60-144351), corresponding to U.S. Pat. No. 4,670,508, discloses a thermoplastic resin composition comprising a melt mix product of polyoxymethylene and ultra high molecular weight polyethylene powder with specified properties, which have excellent abrasion resistance, impact resistance and a high critical PV limit.

Japanese laid open 87-253651 (Kokai Sho 62-253651), corresponding to U.S. Pat. No. 4,663,391, discloses a polycarbonate resin composition comprising an aromatic carbonate resin and a partially fluorinated polyolefin composition which exhibits improved wear resistance. Japanese laid open 88-16756 (Kokai Sho 63-162756) discloses a polycarbonate resin composition comprising an aromatic carbonate resin and a fluorinated polyolefin, a polyolefin, or a silicone liquid composition which also exhibits improved wear resistance.

Japanese laid open 88-182361 (Kokai Sho 63-182361) discloses a styrene resin composition containing rubber-modified styrene resin, polyolefin resin, styrene-olefin graft or block copolymer and dimethylsilicon having improved sliding properties, and Japanese laid open 89-201351 (Kokai 01-201351) discloses a styrene resin composition having an improved sliding property which contains silicone oil and a tin stabilizer and is used for sliding parts of a gear or a cam.

With regard to improving the sliding properties of thermoplastic polyester resins. Japanese laid open 84-170138 (Kokai Sho 59-170138) discloses a polyester resin having improved sliding properties containing a thermoplastic polyester resin, solid lubricant, lubricating oil and polyoxyalkylene compounds. Japanese laid open 89-140253 (Kokai Sho 59-140253) discloses a polybutylene terephthalate resin composition used as a frictional material which is prepared by adding potassium titanate fiber and fluorocarbon resin to polybutylene terephthalate resin and has improved sliding property. Japanese laid open 88-213551 (Kokai Sho 63-213551) discloses a resin composition containing polybutylene terephthalate resin mixed with tetrafluoroethylene resin, reinforcing material and solid lubricant. Japanese laid open 88-297455 (Kokai Sho 63-297455) discloses a polyester resin composition containing dispersed carbon fiber and ultra high molecular weight polyethylene having good sliding properties.

For improving the sliding properties of polyarylene sulfide resins, Japanese laid open 75-119040 (Kokai Sho 50-119040) discloses a polyphenylene sulfide resin containing tetrafluoroethylene resin as a lubricant.

Japanese laid open 77-129761 (Kokai Sho 52-129761) and Japanese patent publication 81-50124 Kokoku sho 56-50124) disclose a polyphenylene sulfide resin containing graphite a polytetrafluoroethylene resin and lubricating oil as a lubricant.

Japanese laid open 76-28145 (Kokai Sho 51-28145) and Japanese patent publication 82-13586 (Kokoku sho 57-13586) disclose a polyphenylene sulfide resin containing a molybdenum disulfide and a carbon fiber having improved sliding properties.

Japanese laid open 85-228558 (Kokai Sho 60-228558) discloses a polyphenylene sulfide resin containing a fiber reinforcement agent, tetrafluoroethylene resin powder, and an inorganic filler having cleavage properties.

Japanese laid open 87-232457 (Kokai Sho 62-232457) discloses a polyphenylene sulfide resin containing a tetrafluoroethylene resin, a reinforcing filler and a specified organic silane.

For improving sliding property of polyamide resins, Japanese laid open 85-96649 (Kokai Sho 60-96649) corresponding to U.S. Pat. No. 4,563,495, discloses a polyamide resin containing a high density polyethylene powder, and potassium titanate whiskers having good sliding properties. Japanese laid open 85-144351 (Kokai Sho 60-144351), corresponding to U.S. Pat. No. 4,670,508, discloses a polyamide resin mixed with a ultra high molecular weight polyethylene powder having a specified particle size having good sliding properties. Japanese laid open 87-218453 (Kokai Sho 62-218453)

discloses a polyamide resin mixed with a carbon fiber and a specified molecular weight polyethylene.

Further a for improving sliding properties of polyphenylene ether resins, Japanese laid open 85-186560 (Kokai Sho 60-186560) discloses a polyphenylene ether resin blended with a polyamide elastomer having improved frictional and abrasion properties.

For improving the sliding properties of polyarylate resins, Japanese laid open 84-179662 (Kokai Sho 59-179662) discloses a polyarylate resin containing a lubricating oil, a lubricating oil carrier, mica, and a solid lubricant.

However, there are defects in the above mentioned prior art. For instance, in the compositions for improving the sliding properties of a polyoxymethylene resin disclosed in Japanese laid open 87-253650 (Kokai Sho 62-253650) and Japanese laid open 88-37198 (Kokai Sho 63-37198), the polyethylene is melted, then kneaded and dispersed into a polyoxymethylene resin but the compatibility of polyethylene with polyoxymethylene is not large enough so that the basic nature and properties of the resin, such as mechanical strength and heat resistance are adversely affected. Moreover, a surface of the molded product often causes delamination and the mixed resin adheres to the cavity of the mold after molding.

A thermoplastic resin composition comprising a mixed melt product of polyoxymethylene and ultra high molecular weight polyethylene powder with specified properties is disclosed in Japanese laid open 85-144351 (Kokai Sho 60-144351), corresponding to U.S. Pat. No. 4,670,508, in which ultra high molecular weight polyethylene powder is dispersed in the system as comparatively large sized particles. The reduction effect of the friction coefficient of the resin is not successful.

Polycarbarbonate resins disclosed in Japanese laid open 87-253651 (Kokai Sho 62-253651) and Japanese laid open 88-162756 (Kokai Sho 63-162756) have improved sliding properties by blending in a fluorinated polyolefin solely, or by blending in a fluorinated polyolefin, a polyolefin and a silicone liquid composition, and exhibit improved wear resistance. However, compatibility of the polycarbonate resin with the fluorinated polyolefin, a polyolefin, and a silicone liquid is not large enough. Consequently, preferable physical and mechanical properties of the polycarbonate resin are adversely affected and the resulting products show a bleeding phenomenon, surface delamination or adhering to a cavity of the mold.

Although a styrene resin composition containing rubber modified styrene resin, polyolefin resin, styrene-olefin, graft or block copolymer and dimethylsilicon disclosed in Japanese laid open 88-182361 (Kokai Sho 63-182361), exhibits a slightly improved sliding property, the resultant product resin does not exhibit good mechanical properties and shows surface delamination and bleeding phenomena, which are all adverse effects.

A styrene resin composition blended with silicone oil and tin stabilizer, disclosed in Japanese laid open 89-201351 (Kokai Hei 01-201351) exhibits an improved anti-burning property during molding but the effect of decreasing of the burned phenomenon of resin when molding is still not satisfied.

A thermoplastic polyester resin containing solid lubricant, lubricating oil and polyoxyalkylene compounds and disclosed in Japanese laid open 84-170138 (Kokai Sho 59-170138), exhibits a slightly improved sliding or friction resistance property but lubricating oil often forms at the surface of the products and the surface thereof becomes sticky.

Thermoplastic polyester resins blended with a fluorine resin or a ultra high molecular weight polyethylene having improved sliding properties disclosed in Japanese laid open 84-140253, 88-213551 and 88-297455 exhibits a slightly improved sliding property but compatibility of the fluorine resin or ultra high molecular weight polyethylene with the thermoplastic polyester resins is not large enough so the basic nature and properties of the thermoplastic polyester resin are adversely affected. Specifically, the mechanical strength thereof is badly affected, surface delamination of the products occurs and the mixed resin adheres to the cavity of mold after molding.

A polybutylene terephthalate resin composition prepared by adding potassium titanate fiber and fluorocarbon resin thereto disclosed in Japanese laid open 89-140253 (Kokai Sho 59-140253), a resin composition containing polybutylene terephthalate resin mixed with tetrafluoroethylene resin, reinforcing material and solid lubricant disclosed in Japanese laid open 88-213551 (Kokai Sho 63-213551) and a polyester resin composition containing dispersed carbon fiber and ultra high molecular weight polyethylene disclosed in Japanese laid open 88-297455 (Kokai Sho 63-297455) all exhibit improved sliding properties but because of poor compatibility of the tetraluforoethylene resin and of the ultra high molecular weight polyethylene with the thermoplastic polyester resins, the thermoplastic polyester resins could not exhibit basic physical and mechanical properties and, more than that surface delamination and adhesion to the cavity of the mold were big problems.

Polyarylene sulfide resins disclosed in Japanese laid open 75-119040, 77-129761, Japanese patent publication 81-50124, 82-13586, and Japanese laid open 85-228558, containing tetrafluoroethylene resin or a solid lubricant such as molybdenum disulfide and graphite exhibit a slightly improved sliding property but abrasion resistance of these resins decreases when a comparatively large amount of the solid lubricant is added. Especially, when tetrafluoroethylene is blended with a polyarylene sulfide resin, the compatibility of the tetrafluoroethylene with the polyarylene sulfide resin is not sufficient and the mechanical properties and surface conditions of the resultant resin decreases as the tetrafluoroethylene sometimes coagulates and does not become uniformly dispersed.

To solve the problem of poor compatibility of the tetrafluoroethylene with the polyarylene sulfide resin, a specified organic silane is added as disclosed in Japanese laid open 88-232457 but the result is still not satisfactory.

Polyamide resins disclosed in Japanese laid open 85-96649, 85-144351 and 87-218453 containing a high density polyethylene resin, an ultra high molecular weight polyethylene or a polyethylene for the purpose of improving the resins sliding properties, have defects in physical and mechanical properties the resin adheres to a cavity of a mold after molding and the delamination of the surface of the product sometimes occurs because the compatibility of the polyethylene resin with the polyamide is not essentially large enough.

Polyphenylene ether resins disclosed in Japanese laid open 85-186560, exhibit a slightly improved abrasion resistance but the coefficient of friction of the resin is not improved.

Polyarylate resins disclosed in Japanese laid open 84-179662 shows improved frictional and anti-abrasion properties but lubricating oil bleeds out to the surface thereof and causes damage to the surface and the mechanical properties of the resins decreases because of the poor compatibility of the lubricating oil and solid lubricant with the resins.

As discussed above, thermoplastic resins having improved sliding properties by adding conventional solid or liquid lubricants or various resins lost their basic mechanical properties.

The objective of the present invention is to provide a sliding property improving agent which does not adversely affect the mechanical strength of the resin.

SUMMARY OF THE INVENTION

This invention is directed to a sliding property improving agent. The sliding property improving agent comprises a multi-phase structure thermoplastic resin which consists of 5 to 95 part by weight of a non-polar α-olefin polymer (a) and 95 to 5 part by weight of a vinyl polymer (b), and the dispersing polymer has a particle size of from 0.001 to 10 μm.

The resultant polymer improves the sliding properties of the thermoplastic resins, shows constant friction reduction effects under various conditions and, at the same time, provides satisfactory mechanical and heat resisting properties to the resin.

DETAILED DESCRIPTION OF THE INVENTION

The inventors of this invention reached the conclusion through intensive research that a specified multiphase structure thermoplastic can be used as a sliding property improving agent without affecting the mechanical and heat resistance properties of the resin.

Preferable examples of the non-polar α-olefin polymer of this invention are an ethylene series polymer, more specifically, at least one polymer among from polyethylene, polypropylene, ethylene and α-olefin copolymer, ethylene, α-olefin and non-conjugated diene copolymer, and ethylene and polar vinyl monomer copolymer.

The polyethylene applicable to this invention is prepared by high pressure radical polymerization or low or middle pressure ion polymerization of an ethylene monomer.

The polypropylene employed in this invention is prepared by ion polymerization of a propylene monomer.

A weight ratio of ethylene and α-olefin in the ethylene and α-olefin copolymer may be from 95:5 to 5:95, where the α-olefin monomer is an unsaturated hydrocarbon having carbon atoms from 3 to 20, for instance propylene, butene-1, pentene-1, hexene-1, heptene-1, octene-1, 4-methyl butene-1, 4-methyl pentene-1. The most preferable compound is propylene.

The α-olefin monomers employed in the ethylene, α-olefin and non-conjugate diene copolymer is an unsaturated hydrocarbon having carbon atoms from 3 to 20, for instance, propylene, butene-1, pentene-1, hexene-1, heptene-1, octene-1, 4-methyl butene-1,4-methyl pentene-1.

Examples of the non-conjugated diene employed in this invention are for instance, ethylidene norbornane, 1,4-hexadiene, 1,5-hexadiene, dicyclopentadiene, 2-methyl-1,5-hexadiene, 1,4-cycloheptadiene, or 1,4-cyclooctadiene.

Examples of the ethylene, α-olefin and non-conjugated diene copolymer employed in this invention are ethylene-propylene-ethylidenenorbornane copolymer rubber, ethylene-propylene-1, 4-hexadiene copolymer rubber, or ethylene-propylene-dicyclopentadiene rubber.

The polar vinyl monomer used in the copolymer consisting of ethylene and polar-vinyl monomer employed in this invention is a monomer having a vinyl group copolymerizable with ethylene, more specifically, for example, an $\alpha,\beta$-unsaturated carbonic acid or a metal salt thereof such as, acrylic acid, methacrylic acid, fumaric acid, maleic acid, maleic acid anhydride, itaconic acid, itaconic acid anhydride, and bicyclo(2,2,1)-5 heptene-2,3-dicarbonic acid, an $\alpha,\beta$-unsaturated carbonic ester such as, methyl acrylate, n-butyl acrylate, isobutyl acrylate, t-butyl acrylate, 2-ethylhexyl acrylated, methyl methacrylate, ethyl methacrylate, n-butyl methacrylate, and isobutyl methacrylate, a vinyl ester such as, vinyl acetate, vinyl propionate, vinyl capronate, vinyl caprylate, vinyl laurinate, vinyl stearate, and vinyl trifluoroacetate, or an unsaturated glycidyl containing monomer such as glycidyl acrylate, glycidyl methacrylate, and itaconic acid monoglycidyl ester.

Examples of the ethylene and polar vinyl monomer copolymer employed in this invention are ethylene-acrylic acid copolymer, ethylene-methyl acrylate copolymer, ethylene-ethylacrylate copolymer, ethylene-isopropylacrylate copolymer, ethylene-n-butyl acrylate copolymer, ethylene-isobutyl acrylate copolymer, ethylene-2-ethylhexyl acrylate copolymer, ethylene-methyl methacrylate copolymer, ethylene-ethyl methacrylate copolymer, ethylene-n-butyl methacrylate, ethylene-isobutyl methacrylate copolymer, ethylene-vinyl acetate copolymer, ethylene-vinyl propionate copolymer, ethylene-ethyl acrylate-maleic acid anhydride copolymer, ethylene-ethyl acrylate-glycidil methacrylate copolymer and ethylene-glycidil methacrylate copolymer.

Examples of the vinyl copolymer employed in the multi-phase structure thermoplastic resin of this invention are polymers obtained by polymerizing 1 or more than 2 of vinyl monomers described as follows:

an aromatic vinyl monomer such as, styrene, nuclear substituted styrene (for instance, methyl styrene, ethyl styrene, isopropyl styrene, chlorostyrene or the like), and α-substituted styrene (for instance, α-methyl styrene, α-ethyl styrene or the like);

a (meth)acrylic acid ester monomer such as, (meth) acrylic acid alkyl ester in which carbon number of the alkyl is from 1 to 7, (for instance, methyl-, ethyl-, propyl-, isopropyl-, butyl-, or the like (meth) acrylate);

a (meth) acrylic acid hydroxalkyl ester monomer such as, 2-hydroxyethylmethacrylate, hydroxypropylmethacrylate, polyethylene glycol monomethylacrylate, polypropylene glycol monomethacrylate or the like; vinyl cyanide monomer such as, acrylonitrile or methacrylonitrile;

a vinyl ester monomer such as, vinyl acetate, and vinyl propionate;

a (methyl) acrylamide monomer such as, acrylamide, or methacrylamide;

a vinyl monomer derivative of an unsaturated carbonic acid [for instance, (meth) acrylic acid, maleic acid, of fumaric acid; itaconic acid, citraconic acid, crotonic acid] or amide, imide, ester, and anhydride thereof.

More preferably, an aromatic vinyl monomer, (meth) acrylic acid ester monomer, vinyl cyanide monomer, or vinyl ester monomer are employed in this invention.

Especially, a vinyl copolymer consisting of 0 to 50% by weight of vinyl cyanide monomer and 50 to 100% by weight of aromatic vinyl monomer or a vinyl polymer containing more than 50% by weight of (meth) acrylic acid ester is the best example of this invention since these compounds have excellent dispersion properties into thermoplastic resins.

In this specification, the multi-phase structure thermoplastic resin is defined as a thermoplastic resin which consists of a non-polar $\alpha$-olefin polymer or a vinyl polymer matrix, and contains a different non-polar $\alpha$-olefin polymer or a different vinyl polymer from said polymer matrix, has a spherical shape and disperses uniformly and insularly therein.

The diameter of said dispersing polymer ranges from $0.001 \sim 10$ $\mu$m, more preferably, from $0.001 \sim 5$ $\mu$m.

When the diameter of said dispersing resin is less than 0.001 $\mu$m or larger than 5 $\mu$m, the dispersing degree thereof is no longer acceptable when blended with a thermoplastic resin and the surface appearance of the resultant products are poor or the mechanical properties of said resin are adversely affected.

The mean number degree of polymerization of said vinyl polymer employed in this multi-phase structure thermoplastic resin is $5 \sim 10,000$, more preferably, $10 \sim 5,000$.

If said mean number degree of polymerization is less than 5, however, the sliding property improving effect is accomplished but the dispersing property of said sliding property improving agent is not sufficient. Accordingly mechanical properties of the resin are no longer favorable. On the other hand, when the mean number degree of polymerization is larger than 10,000, the viscosity of said resin becomes high and, therefore, the molding properties of said resin decrease and the surface gloss of said products also decreases.

The multi-phase structure thermoplastic resin having improved sliding properties consists of from 5% to 95% by weight of non-polar $\alpha$-olefin polymer, more preferably, from 20% to 90% by weight. Accordingly, the vinyl polymer content in said multi-phase structure thermoplastic resin is from 95% to 5% by weight, more preferably, from 80% to 10% by weight.

If the non-polar $\alpha$-olefin polymer content is less than 5% by weight, its degree of effectiveness as a sliding property improving agent is not sufficient and unfavorable. Conversely if the amount of said non-polar $\alpha$-olefin polymer exceeds 95% by weight, its degree of effectinveness as a sliding property improving agent is adequate but the mechanical properties of the resin and its heat resistance are adversely affected.

It is possible to employ a well known conventional graft polymerization method such as the chain transfer method or ionizing radiation, induced polymerization for making the multi phase structure thermoplastic resin of this invention but the most preferred method of making the thermoplastic resin is described as follows. According to the methods described hereinafter, one can produce the thermoplastic resin having a very fine and uniform particle diameter and no secondary heat coagulation properties. Therefore, its degree of effectiveness as a sliding property improving agent increases.

Now, methods of making said multi-phase structure thermoplastic resin used as a sliding property improving agent is specifically described in detail.

First, said multi-phase structure thermoplastic resin is prepared by suspending 100 parts by weight of a non-polar $\alpha$-olefin polymer in water and adding thereto a solution separately prepared by dissolving from 5 to 400 parts by weight of at least one vinyl monomer and 0.01 to 5 parts by weight (with respect to 100 parts by weight of the vinyl polymer) of a radical polymerization initiator having a decomposition temperature of 40° to 130° C. at a 10 hour half life. The weight ratio of said vinyl monomer (s) and said radical polymerization initiator is from 100:0.01 ~ 100:5.

The resultant mixture is heated under a condition such that said radical polymerization initiator does not substantially start decomposing and causing impregnation of the non-polar $\alpha$-olefin polymer with said vinyl monomer (s) and said radical polymerization initiator.

The temperature of said water suspension is when the degree of impregnation exceeds 10% by weight of the initial amount, and the vinyl monomer (s) is polymerized inside said non-polar $\alpha$-olefin polymer. Hereinafter, the obtained non-polar $\alpha$-olefin polymer impregnated with polymerized vinyl monomer will be referred to as polymer (A).

Polymer (A) is a multi-phase structure thermoplastic resin according to the definition so polymer (A) itself may be used as a sliding property improving agent.

Polymer (A) can be melted and kneaded at the temperature of from 100° to 300° C. and is also a multi-phase structure polymer which is effective as a sliding property improving agent.

A multi-phase structure thermoplastic resin is obtained by blending said polymer (A) with less than 99% by weight of a non-polar $\alpha$-olefin or less than 99% by weight of a vinyl monomer and kneading under molten conditions.

A multi-phase structure thermoplastic resin is also obtained by blending said polymer (A) with less than 99% by weight of the non-polar $\alpha$-olefin and less than 99% by weight of the vinyl monomer and kneading under molten conditions.

The best sliding property improving agent among the above mentioned thermoplastic resins is the molten and kneaded polymer (A).

Another method of making a multi phase structure thermoplastic resin involves suspending 100 parts by weight of a non-polar $\alpha$-olefin polymer in water; adding to said suspension a solution separately prepared by dissolving from 5 to 400 parts by weight of at least one vinyl monomer and 0.1 to 10 parts by weight (with respect to 100 parts by weight of the vinyl monomer) of a radical polymerizable organic peroxide described as general formula (a) or (b), or a mixture of more than 2 of said radical polymerizable organic peroxides described as general formula (a) or (b), and from 0.01 to 5 parts by weight (with respect to 100 parts by weight of said vinyl monomer(s) and said radical polymerizable organic peroxide) of a polymerization initiator having a decomposition temperature of from 40° to 90° C. at a 10 hour half life; heating said resultant mixture under a condition, such that said radical polymerization initiator does not substantially start decomposing, thereby causing the impregnation of the non-polar $\alpha$-olefin polymer with said vinyl monomer(s), and said radical polymerizable organic peroxide, and said radical polymerization initiator; raising the temperature of said water suspension when the degree of impregnation exceeds 10% by weight of the initial amount; and copolymerizing said vinyl monomer(s) and said radical polymerizable organic peroxide inside said non-polar α-olefin polymer. Hereinafter, the obtained non-polar α-olefin polymer impregnated with said copolymerized vinyl monomer and said radical polymerizable organic peroxide is referred to as polymer (B).

Polymer (B) is a multi-phase structure thermoplastic resin according to the aforementioned definition so said polymer (B) by itself may be used as a sliding property improving agent.

Polymer (B) is melted and kneaded at a temperature of from 100° to 300° C. and is also a multi-phase structure thermoplastic resin which is effective as a sliding property improving agent.

A multi-phase structure thermoplastic resin is obtained by blending said polymer (B) with less than 99% by weight of a non-polar α-olefin or less than 99% by weight of a vinyl monomer and by kneading under molten conditions.

A multi-phase structure thermoplastic resin is also obtained by blending said polymer (B) with less than 99% by weight of a non-polar α-olefin and less than 99% by weight of a vinyl monomer and kneading under molten conditions.

The best sliding property improving agent among the above-mentioned thermoplastic resins is said kneaded polymer (B) containing a graft copolymer.

The radical polymerizable organic peroxide described as general formula (a) is as follows;

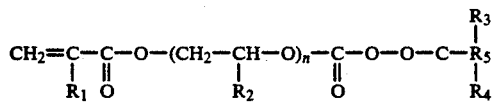

(where $R_1$ is a hydrogen atom or an alkyl group having 1 to 2 carbon atoms, $R_2$ is a hydrogen atom or a methyl group, $R_3$ and $R_4$ are alkyl groups with 1 to 4 carbon atoms and $R_5$ is an alkyl group having 1 to 12 carbon atoms, a phenyl group or an alkyl-substituted phenyl group having 1 to 12 carbon atoms or a cycloalkyl group having 3 to 12 carbon atoms, and m is an integer of 1 or 2).

The radical polymerizable organic peroxide described as general formula (b) is as follows;

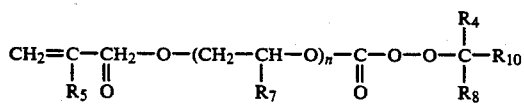

(where $R_5$ is a hydrogen atom or an alkyl group having 1 to 4 carbon atoms, $R_7$ is a hydrogen atom or a methyl group, $R_5$ and $R_6$ are alkyl groups having 1 to 4 carbon atoms, $R_{10}$ is an alkyl group having 1 to 12 carbon atoms, a phenyl group or a substituted alkyl-phenyl group or a cycloalkyl group having 3 to 12 carbon atoms, and n is an integer of 0, 1 or 2.)

Radical polymerizable organic peroxides disclosed in Japanese laid open 89-131220 (Kokai Hei 1-131220) may be employed as radical polymerizable organic peroxides described as general formula (a) and (b).

Preferable compounds are t-butylperoxyacryloiroxyethylcarbonate, t-butylperoxymethacryloiroxyethylcarbonate, t-butylperoxyarylcarbonate, and t-butylperoxymetharylcarbonate.

The multi-phase structure resin according to this invention should have a structure that in a vinyl polymer or a non-polar α-olefin polymer matrix a different α-olefin polymer or a different vinyl polymer respectively is dispersed uniformly and insularly but said matrix and said dispersing polymer is not necessarily chemically bonded, such as graft copolymerization.

However, it is much more preferable that said matrix and said dispersing polymer be chemically bonded, because its degree of effectiveness as a sliding property improving agent increases.

Further, when a lubricating material is added to said multi-phase structure thermoplastic resin within a range of 0.1% to 50% by weight, the sliding property improving effect is far more improved.

If the amount of the lubricating material is less than 0.1% by weight, the improvement is comparatively low and, on the other hand, if the amount exceeds 50% by weight, the mechanical properties of the products and their surface appearance are adversely affected.

Examples of lubricating material employed in this invention are conventional lubricating materials which have been used for improving the sliding properties of resins, such as a mineral oils such as spindle oil, freezer oil, turbine oil, machine oil, cylinder oil, gear oil; hydrocarbons such as liquid paraffins, parafin wax, polyethylene wax; fatty acids such as lauric acid, myristic acid, paltimic acid, stearic acid, arachidonic acid, behenic acid, montanic acid; alcohols such as hexyl alcohol, octyl alcohol, cetyl alcohol, stearyl alcohol, behenyl alcohol, glycol, glycerin, polyglycerol, pentaerythritol; fatty acid esters such as stearyl stearate, behenyl beherate, pentaerythritol tristearate, pentaerythritol tetrastearate, glycerin monostearate, glycerin mono-behenate; fatty acid amides such as stearamide, palmitamide, oreylamide, ethylene bisstearoamide; metallic drops such as calcium stearate, zinc stearate, magnesium stearate; natural waxes such as montan wax; silicones and mixtures of these lubricating materials may be employed in this invention.

Fatty acids, alcohols, fatty acid esters, silicones and mineral oils are preferably employed in this invention.

The sliding property improving agent according to the invention is preferably applied to thermoplastic resins, more specifically, polyoxymethylene resins polycarbonate resins styrene resins, polyester resins polyarylenesulfides polyamides, polyphenylene ethers, polyarylates, and mixtures thereof.

Examples of polyoxymethylenes are oxymethylene homopolymer, and a copolymer or terpolymer thereof which mostly comprises oxymethylene monomers such as disclosed in Japanese laid open 88-344 (Kokai Sho 63-344).

Examples of polycarbonate resins are 4,4-dihydroxydiphenyl 2,2-propane, (usually referred as bisphenol A), and 4,4-dioxyarylalkane polycarbonate, such as, disclosed in Japanses laid open 87-253651 (Kokai Sho 62-253651).

Examples of styrene resins applicable to the invention are disclosed in Japanese laid open 88-248836 (Kokai Sho 63-248836).

Polystyrene, styrene-butadiene copolymer, styrene-acrylonitrile copolymer, and styrene-butadiene-acrylonitrile copolymer are preferably employed in this invention.

Examples of thermoplastic polyester resins are disclosed in Japanese laid open 84-170138 (Kokai Sho 59-170138). Polyethylene terephthalate and polyethylene terephthalate are preferably employed in the invention.

Examples of arylene sulfide resins are disclosed in Japanese patent publication 70-3368 (Kokoku Sho 45-3368), Japanese patent publication 77-12240 (Kokoku Sho 52-12240), Japanese laid open 78-136100 (Kokai Sho 53-136100), Japanese laid open 86-7332 (Kokai Sho 61-7332) and Japanese laid open 88-39926 (Kokai Sho 63-39926). Polyphenylene sulfide resins having either a crosslinked structure or a linear structure are preferably employed in the invention.

Examples of polyamide resins are disclosed in Japanese laid open 85-144351 (Kokai Sho 60-144351). Aliphatic polyamide resins such as, nylon 6, nylon 66, nylon 610, nylon 11, nylon 12, nylon 612, and nylon 46, and aromatic polyamide resins such as polyhexadiamine terephthalamide, polyamide resins having an xylene group are preferably employed in the invention.

Examples of polyphenylene ether resins are polyphenylene ether homopolymers or copolymers obtained by polycondensating monocyclic phenals of more than one kind such as, 2,6-dimethyl phenol; or a composition comprising a polyphenylene ether resin and aromatic vinyl polymers such as, polystyrene reinforced with rubber as disclosed in Japanese laid open 85-186560 (Kokai Sho 60-186560).

Examples of polyarylate resins are polyesters obtained by polymerizing bisphenol and terephthalic acid and/or isophthalic acid disclosed in Japanese laid open 89-268751 (Kokai Hei 1-268751).

The proper amount of sliding property improving agent of this invention added to the resins is within a range of 0.1% to 50% by weight with respect to said thermoplastic resin.

When the amount of the sliding property improving agent is less than 0.1% by weight, the degree of effective improvement is not sufficient and, on the other hand when the amount exceeds 50% by weight, the mechanical properties and heat resistance of the resin are adversely affected.

It is also possible to add additives described below to the system within in the scope of this invention.

Additives

Inorganic fire retardents such as magnesium hydroxide and aluminum hydroxide; organic fire retardant such as fire retardants containing halogen and phosphorus; particle fillers such as, calcium sulfate, calcium silicate, clay, diatomaceous earth, talc, alumina, silica sand, glass powder, iron oxide, metal powder, graphite, silicon carbide, silicon nitride, silica, boron nitride, aluluminum nitride, carbon black, and molybdenum disulfide; scaled or plate-like filler such as mica, glass plate, sericite, pyrophyllite, metal powder such as aluminum flake, and graphite; hollow filler such as, silas balloon, metal balloon, glass balloon and and pumice stone; fibrous fillers such as glass fibers carbon fibers silicon carbide fibers mineral fibers such as, asbestos and wollastonite; monocrystalline fibrous fillers such as potassium titanate whisker, calcium sulfide whisker, and carbon whisker; organic fillers such as wood particles; additives such as, antioxidants, anti-ultraviolet ray agents, lubricants, dispersing agents, coupling agents, foaming agents, cross linking agents, and coloring agents; and engineering plastics such as, polyolefin resins, polyoxymethylene resins, polyamide resins, polyester resins, polycarbonate resisns, ABS resins, polyphenylene sulfide resins, polyarylate resins and fluorine-contained polymers.

DESCRIPTION OF THE EMBODIMENT

The invention of this application will be more specifically explained in detail with the following embodiments.

The kinetic friction coefficient is measured under the condition described below throughout the examples and comparative examples of the invention.

MEASUREMENT OF THE DYNAMIC FRICTION COEFFICIENT

Tester: Friction Abrasion Tester manufactured by Orientec Model EFM-III-F (High speed type).

Counter member: cylindrical member having outer diameter of 25.6 mm and inner diameter of 20 mm. Material: S45C.

Test piece: 30 mm×30 mm, 3 mm thick,

Test condition: loading pressure: 5 kg/cm$^2$, velocity: 30 cm/sec or 5 kg/cm$^2$, velocity: 80 cm/sec.

Tests of tensile strength, flexural modulus, and heat deflection temperature are conducted complying with the Japanese Industry Standard (JIS).

Tensile Strength:

JIS K-7113 test velocity 10 mm/min.

Flexural Modulus: JIS K-7203 test velocity 2 mm/min.

Heat Deflection Temperature: JIS K-7207 loading pressure 18.5 kg/cm$^2$

The appearance of the product made by injection molding was tested by the naked eye to determine whether surface delamination or surface separation of the product was observed.

REFERENCE EXAMPLES 1~9

Production of multi-phase structure thermoplastic resin (A~I)

2500 g of pure water was poured into a stainless steel autoclave of 5l volume and 2.5 g of polyvinyl alcohol was dissolved in said pure water to form a suspension. Then 700 g of low density (0.924 g/cm$^2$) polyethylene, as a non-polar α-olefin polymer (manufactured by Nippon Petroleum Chemical Co. Ltd., Trade name: LEXLON F41), was mixed and dispersed into said suspension. 1.5 g of benzoyl peroxide as a radical polymerization initiator (manufactured by Nippon Oil & Fast Co., Ltd., Trade name is NYPER-B) and 6 g of t-butyl peroxymethacryloyloxyethyl carbonate as a radical polymerizable organic peroxide was dissolved and agitated with the mixture of 210 g of styrene monomer and 90 g of acrylonitrile as a vinyl monomer and said solution was poured into said autoclave and agitated therein. The temperature of the autoclave was elevated up to 60°~65° C. and agitated for 2 hours to impregnate the polyethylene with said vinyl monomer containing the radical polymerization initiator and radical polymerizable organic peroxide.

When the total amount of vinyl monomer, radical polymerization initiator and radical polymerizable peroxide is confirmed to be over 10% of the initial amount thereof, then the temperature of the autoclave was raised up to 80° to 85° C. and maintained at this temperature for 7 hours for completion of the polymerization. The resultant product was washed and dried and polymer (A') was obtained.

Styrene-acrylonitrile copolymer involved in said product polymer (A') was extracted by using ethyl acetate, and the mean number degree of polymerization of said polymer was measured by GPC and found to be 900. Said polymer (A') was extruded using a Laboplast Mill single screw extruder (manufactured by Toyo Seiki Seisakusho Co., Ltd.) at temperature of 200° C. so that multi-phase structure thermoplastic (A) was obtained. The resultant phase structure thermoplastic resins were observed through electron microscope.

According to the observation through an electron microscope (JEOL JSM T 300, manufactured by Nihon Denishi Co. Ltd.), the multi phase structure thermoplastic resin consists of uniformly dispersed particle resins having a perfect sphere shape and a diameter of 0.3~0.4 μm. At this time, graft efficiency of the acrylo-nitrile copolymer was 62.3% by weight. According to the method described above, the other multi phase structure thermoplastic resin B~I were also made varying the amount and the species of the non-polar α-olefin polymer as described in table 1.

REFERENCE EXAMPLE 10

Production of Vinyl Polymer (i)

2500 g of pure water was poured into a stainless steel autoclave with volume of 5l and 2.5 g of polyvinyl alcohol was dissolved in said pure water to form a suspension.

Then, 5 g of benzoyl peroxide as a radical polymerization initiator (manufactured by Nippon Oil & Fats Co., Ltd., Trade name NYPER-B) was dissolved with a mixture of 700 g of styrene monomer and 300 g of acrylonitrile monomer as a vinyl monomer, and said solution added to the suspension and agitated in the autoclave.

The temperature of the autoclave was elevated up to 80°~85° C. and maintained at this level for 7 hours for completion of the polymerization. The resultant product was washed and dried and styrene-acrylonitrile copolymer as a vinyl polymer (i) was obtained.

The mean number degree of polymerization of said styrene-acrylonitrile copolymer was measured as 850.

REFERENCE EXAMPLE 11

Product of Vinyl Polymer (ii)

In example 10, 1000 g of methylmethacrylate monomer was employed as a vinyl monomer instead of the mixture of 700 g of styrene monomer and 300 g of acrylonitrile monomer, and 2 g of n-dodecyl mercaptan as a molecular weight adjusting agent was added to the system. The rest was the same as in example 10. Then, methylmethacrylate as a vinyl polymer (ii) was obtained having a mean number degree of polymerization of 730.

REFERENCE EXAMPLE 12

Production of Vinyl Polymer (iii)

In example 10, 1000 g of styrene monomer was employed as a vinyl monomer instead of the mixture of 700 g of styrene monomer and 300 g of acrylonitrile monomer.

The rest is the same as in example 10. Then, styrene polymer as a vinyl polymer (iii) was obtained of which the mean number degree of polymerization was 820.

REFERENCE EXAMPLE 13~18

Production of Multi-Phase Structure Thermoplastic Resin

A polymer selected from the polymers (A'~C') obtained in examples 1~3 and a low density polyethylene (Manufactured by Nippon Petroleum Chemical Co., Ltd., Trade name Lexlon) as a non-polar α-olefin polymer or a vinyl polymer selected from polymers (i~iii) obtained in examples 10~12 were blended as indicated in table 2 and extruded using a Laboplast Mill single screw extruder (manufactured by Toyo Seiki Seisakusho Co., Ltd.) at temperature of 200° C. The resultant products of multi-phase structure thermoplastic resins (J~O) were obtained.

REFERENCE EXAMPLE 19~21

Production of Multi-Phase Structure Thermoplastic Resins (P~U)

In example 1, t-butyl peroxymethacryloyloxyethyl carbonate as a radical polymerizable organic peroxide was excluded and the rest was the same as example 1. The multi-phase structure thermoplastic resins P~U indicated in table 3 were obtained.

REFERENCE EXAMPLE 22~27

Production of Multi-Phase Structure Thermoplastic Resins (V~a)

A multi-phase structure thermoplastic resin selected from the polymers prepared in reference examples 19~21 and a low density polyethylene (Manufactured by Nippon Petroleum Chemical Co., Ltd., Trade name Rexlon) as a non-polar α-olefin polymer or a vinyl polymer selected from polymers (i~iii) prepared in reference examples 10~12 were blended as indicated in table 4 and extruded using a Laboplast Mill single screw extruder (manufactured by Toyo Seiki Seisakusho Co., Ltd.) at a temperature of 200° C. The resultant products of multi-phase structure thermoplastic resins (V~a) were obtained.

REFERENCE EXAMPLE 28~35

Production of Multi-Phase Structure Thermoplastic Resins (b~i)

A lubricating material selected from stearyl stearate (Manufactured by Nippon Oil & Fats Co., Ltd., Trade name Unistar M9676), mineral oil (Manufactured by Idemitsu Kosan Co., Ltd., Trade name Dafny mechanic oil #100) and dimethyl polysiloxane (Manufactured by Toray Silicone Co., Ltd., Trade name SH 200) was added to a multi-phase structure thermoplastic resin selected from the polymers prepared in reference examples 1 and 19~21 were blended therewith as indicated in table 5. Resultant products of multi-phase structure thermoplastic resins (b~i) were obtained as shown in table 5.

EXAMPLE 1~20

A polyoxymethylene (Manufactured by Polyplastics Co., Ltd., Trade name Duracon M90-01) and a sliding property improving agent (multi-phase structure thermoplastic resin) prepared in the reference examples were blended as shown in table 6 using a twin-screw extruder (Manufactured by Kurimoto Iron Works Co., Ltd., Trade name KRC Kneader type S-1) at a temperature 210° C. A test piece was made using a injection molding machine (Manufactured by Tabata Machine Co., Ltd., Trade name TS-35-FV25) at a temperature of 200° C. and subjected to the various tests shown in table 6 such as, tensile strength, flexural modulus, heat deflection, and kinetic friction measurement (against steel: test condition:5 kg/cm$^2$, linear velocity:30 cm/sec.)

Results of the tests are also shown in table 6.

COMPARATIVE EXAMPLE 1~16

A test piece was also made according to the method described above except that the amount of multi-phase structure thermoplastic resin was different from that of examples 1~20 or a polyethylene resin was employed in place of said multi-phase structure thermoplastic resin as shown in table 7 and tested.

Test results are shown in table 7.

EXAMPLE 21~46

A polycarbonate resin (Manufactured by Teijin Kasei Co., Ltd., Trade name Panlite L-1250), a glass fiber (as an inorganic filler) having a mean fiber length of 3.0 mm and diameter of 13 μm and a sliding property improving agent (multi-phase structure thermoplastic resin) prepared in the reference examples were blended as shown in table 8 using a twin-screw extruder (Manufactured by Kurimoto Iron Works Co., Ltd., Trade name KRC Kneader type S-1) at a temperature of 270° C.

A test piece was made using a injection molding machine (Manufactured by Tabata Machine Co., Ltd., Trade name TS-35-FV25) at a temperature of 275° C. and subjected to various tests as shown in table 6 such as, tensile strength, flexural modulus, heat deflection, and kinetic friction measurement test (against steel: test condition:5 kg/cm², linear velocity:30 cm/sec.)

Results of the tests are also shown in table 8.

COMPARATIVE EXAMPLE 17~32

A test piece was also made according to the method described above except that the amount of multi phase structure thermoplastic resin was different from that of example 21~46 or a polyethylene resin was employed in place of said multi-phase structure thermoplastic resin as shown in table 8 and tested.

Test results are shown in table 8.

EXAMPLES 47~98

An acrylonitrile-butadiene-styrene copolymer (as a styrene resin) (Manufactured by Ube Cycon Co., Ltd., Trade name Cycorac EX121), a high impact resistance polystyrene resin (Manufactured by Asashi Kasei Co., Ltd., Trade name HI Styron 404), a general purpose styrene resin (Manufactured by Asashi Kasei Co., Ltd., Trade name GP Styron 666), a sliding property improving agent (multi-phase structure thermoplastic resin) prepared in the reference examples and a glass fiber (as an inorganic filler) having a mean fiber length of 3.0 mm and diameter of 13 μm, were blended as shown in table 10 using a twin-screw extruded (Manufactured by Kurimoto Iron Works Co., Ltd., Trade name KRC Kneader type S-1) at a temperature of 230° C. A test piece was made using a injection molding machine (Manufactured by Tabata Machine Co., Ltd., Trade name TS-35-FV25) at a temperature of 230° C. and subjected to various tests as shown in table 10 such as, tensile strength, flexural modulus, heat deflection, and kinetic friction measurement (against steel: test condition:5 kg/cm², linear velocity:30 cm/sec.)

Results of the tests are also shown in table 10.

COMPARATIVE EXAMPLE 33~49

A test piece was also made according to the method described above except that the amount of multi-phase structure thermoplastic resin was different from that of examples 47~98 or a polyethylene resin was employed in place of said multi-phase structure thermoplastic resin as shown in table 11 and tested.

Test results are shown in table 11.

EXAMPLES 99~126

A polybutyleneterephthalate resin as a thermoplastic polyester resin (Manufactured by Polyplastics Co., Ltd., Trade name Duranex 2002), a polyethylene terephthalate resin (ultimate viscosity is 0.74), a glass fiber (as an inorganic filler) having a mean fiber length of 3.0 mm and diameter of 13 μm, and a sliding property improving agent(multi-phase structure thermoplastic resin) prepared in the reference examples were blended as shown in table 12 using a twin-screw extruder (Manufactured by Kurimoto Iron Works Co., Ltd., Trade name KRC Kneader type S-1) at a temperature of 230° C. A test piece was made using a injection molding machine (Manufactured by Tabata Machine Co., Ltd., Trade name TS-35-FV25) at a temperature of 230° C. (280° C., when polyethylene terephthalate resins was employed) and subjected to various tests as shown in table 12 such as, tensile strength, flexural modulus, heat deflection and kinetic friction measurement (against steel; test condition: 5 kg/cm², linear velocity: 30 cm/sec.)

Results of the tests are also shown in table 12.

COMPARATIVE EXAMPLE 50~65

A test piece was also made according to the method described above except that the amount of multi-phase structure thermoplastic resin was different from that of examples 99~126 or a polyethylene resin was employed in place of said multi-phase structure thermoplastic resin as shown in table 13 and tested.

Test results are shown in table 13.

EXAMPLE 127~155

A polyphenylene sulfide resin as a polyarylenesulfide resin (melting viscosity is 2,900 poise; 300° C., load 10 kg), a glass fiber (as an inorganic filler) having a mean fiber length of 3.0 mm and diameter of 13 μm, and a sliding property improving agent (multi phase structure thermoplastic resin) prepared in the reference examples were blended as shown in table 14 using a twin-screw extruder (Manufactured by Kurimoto Iron Works Co., Ltd., Trade name KRC Kneader type S-1) at temperature of 290° C.

A test piece was made using a injection molding machine (Manufactured by Tabata Machine Co., Ltd., Trade name TS-35-FV25) at temperature of 320° C. and subjected to various tests as shown in table 14 such as, tensile strength, flexural modulus, heat deflection, and kinetic friction measurement (against steel: test condition: 5 kg/cm², linear velocity: 80 cm/sec.)

Results of the tests are also shown in table 14.

COMPARATIVE EXAMPLE 66~81

A test piece was also made according to the method described above except that the amount of said multi-phase structure thermoplastic resin was different from that of examples 127~155 or a polyethylene resin was employed in place of said multi-phase structure thermoplastic resin as shown table 15 and tested.

Test results are shown in table 15.

EXAMPLE 156~191

A nylon 6 resin (manufactured by Ube Industries, Ltd., Trade name Ube Nylon 1013B), nylon 66 resin (manufactured by Ube Industries, Ltd., Trade name Ube Nylon 2020B), a nylon MXD 6 resin (Manufactured by Mitsubishi Gas Chemical Co., Inc., Trade name Reny 602), as a polyamide resin, a glass fiber (as an inorganic filler) having a mean fiber length of 3.0 mm and diameter of 13 μm, and a sliding property improving agent (multi-phase structure thermoplastic resin) prepared in the reference examples were blended as shown in table 16 using a twin-screw extruder (Manufactured by Kurimoto Iron Works Co., ltd., Trade name KRC Kneader type S-1) at a temperature of 240° C. (275° C. for nylon 66, and 260° C. for nylon MXD resin).

A test piece was made using a injection molding machine (Manufactured by Tabata Machine Co., Ltd., Trade name TS-35-FV25) at a temperature of 240° C. (275° C. for nylon 66, and 260° C. for nylon MXD resin) and subjected to various tests as shown in table 16 such as, tensile strength, flexural modulus, heat deflection, and kinetic friction measurement (against steel: test condition: 5 kg/cm$^2$, linear velocity: 30 cm/sec.)

Results of the tests are also shown in table 16.

COMPARATIVE EXAMPLE 82-97

A test piece was also made according to the method described above except that the amount of the multi-phase structure thermoplastic resin was different from that of examples 156~192 or a polyethylene resin was employed in place of said multi-phase structure thermoplastic resin as shown in table 17 and tested.

Test results are shown in table 17.

EXAMPLES 192~227

A modified polyphenylene ether resin (Manufactured by EPL Co., Ltd., Trade name Noril 731J) as a mixture of polyphenylene ether resin and styrene resin, or a polyphenylene ether resin (melting viscosity is 30,000 poise at 300° C., shear velocity: 100 s$^{-1}$) as a sole polyphenylene ether resin, a glass fiber (as an inorganic filler) having a mean fiber length of 3.0 mm and diameter of 13 μm, and a sliding property improving agent (multi-phase structure thermoplastic resin) prepared in the reference examples were blended as shown in table 18 using a twin-screw extruder (Manufactured by Kurimoto Iron Works Co., ltd., Trade name KRC Kneader type S-1) at temperature of 270° C.

A test piece was made using an inline screw type injection molding machine (Manufactured by Tabata Machine Co., Ltd., Trade name TS-35-FV25) at temperature of 290° C. and subjected to various tests as shown in table 18 such as, tensile strength, flexural modulus, heat deflection, and kinetic friction measurement (against steel: test condition: 5 kg/cm$^2$, linear velocity: 80 cm./sec.)

Results of the tests are also shown in table 18.

COMPARATIVE EXAMPLE 98~113

A test piece was also made according to the method described above except that the amount of said multi-phase structure thermoplastic resin was different from that of examples 192~227 of a polyethylene resin was employed in place of said multi-phase structure thermoplastic resin as shown table 19 and tested.

Test results are shown in table 19.

EXAMPLES 228~255

A polyarylate resin (Manufactured by Unitika, Ltd., Trade name U polymer U 100), a glass fiber (as an inorganic filler) having a mean fiber length of 3.0 mm and diameter of 13 μm and a sliding property improving agent (multi-phase structure thermoplastic resin) prepared in the reference examples were blended as shown in table 20 using a twin-screw extruder (Manufactured by Kurimoto Iron Works Co., ltd., Trade name KRC Kneader type S-1) at temperature of 320° C.

A test piece was made using a injection molding machine (Manufactured by Tabata Machine Co., Ltd., Trade name TS-35-FV25) at temperature of 340° C. and subjected to various tests as shown in table 20 such as tensile strength, flexural modulus, heat deflection, and kinetic friction measurement (against steel: test condition: 5 kg/cm$^2$, linear velocity: 80 cm/sec.)

Results of the tests are also shown in table 20.

COMPARATIVE EXAMPLE 114~129

A test piece was also made according to the method described above except that the amount of said multi-phase structure thermoplastic resin was different from that of examples 228~255 or a polyethylene resin was employed in place of said multi-phase structure thermoplastic resin as shown in table 21 and tested.

Test results are shown in table 21.

It may now be clearly understood that according to the invention disclosed above, the multi-phase structure thermoplastic resin functions as a perfect sliding property improving agent.

It is also found that a combination use of said multi-phase structure thermoplastic as a sliding property improving agent and lubricating material exhibits, a more improved effect.

It is also clear that the multi-phase structure thermoplastic resin of this invention disperses into a thermoplastics merely by blending under a molten state and the surface appearance of the resultant products containing the multi-phase structure thermoplastic resin has no defects and no delamination was observed.

A multi-phase structure thermoplastic resin according to this invention as a sliding property improving agent effectively improves the property of the resins without adversely affecting the mechanical and physical properties of the thermoplastic resins and the sliding property is improved only by blending under a molten state. Further, the degree of effectiveness of this agent is easily controlled by the amount of the agent added to the system, therefore, the agent of this invention is preferably applicable to a multi-kind small lot production system.

Consequently, the sliding property improving agent according to this invention may widely be used in the field of electric and electro-mechanical industries, precision machine industries and automobile industries.

Obviously, other modifications and variations of the instant invention are possible in light of the above teachings. It is, therefore, to be understood that changes may be made in the particular embodiments described above which are within the full intended scope of the inventions defined by the appended claims.

TABLE 1

| | Reference Example No. | | | | | | | | |
|---|---|---|---|---|---|---|---|---|---|
| | 1 | 2 | 3 | 4 | 5 | 6 | 7 | 8 | 9 |
| Symbol of multi phase structure thermoplastic resin | A | B | C | D | E | F | G | H | I |
| Non-Polar α-olefin polymer: | | | | | | | | | |
| Low density polyethylene | 700 g | 700 g | 700 g | — | — | — | — | — | — |
| High density polyethylene | — | — | — | 700 g | 700 g | — | — | — | — |
| Ultra high-molecular weight polyethylene | — | — | — | — | — | 700 g | 700 g | — | — |
| Linear low density polyethylene | — | — | — | — | — | — | — | 700 g | 700 g |
| Vinyl monomer: | | | | | | | | | |
| Styrene monomer | 210 g | — | 300 g | 210 g | 300 g | 210 g | 300 g | 210 g | 300 g |
| Acrylo nitrile monomer | 90 g | — | — | 90 g | — | 90 g | — | 90 g | — |
| Methyl methacrylate monomer | — | 300 g | — | — | — | — | — | — | — |
| Molecule weight adjusting agent: n-dodecil melcaptan | — | 0.6 g | — | — | — | — | — | — | — |
| Mean grade of polymerization of vinyl polymer | 900 | 700 | 850 | 850 | 830 | 870 | 825 | 920 | 850 |
| Diameter of dispersing resin in the mullti phase resin | 0.3~0.4 | 0.1~0.2 | 0.2~0.3 | 0.3~0.4 | 0.3~0.4 | 0.3~0.4 | 0.4~0.5 | 0.2~0.3 | 0.2 0.3 |

Low density polyethylene: Nippon Petrochemicals Co., Ltd. "Rexlon F41" density = 0.924 g/cm$^3$,
High density polyethylene: Nippon Petrochemicals Co., Ltd., "Staflen E780" density = 0.963 g/cm$^3$,
Ultra High molecular weight polyethylene: Mitsui Petrochemical Industries, Ltd., "Lubmer L400" density = 0.966 g/cm$^3$,
Linear low density polyethylene: Nippon Petrochemicals Co., Ltd., "Linelex AJ5310" density = 0.923 g/cm$^3$,

TABLE 2

| | Reference Example No. | | | | | |
|---|---|---|---|---|---|---|
| | 13 | 14 | 15 | 16 | 17 | 18 |
| Symbol of Multi phase structure thermoplastic Resin | J | K | L | M | N | O |
| Multi phase structure thermoplastic: (% by weight) | | | | | | |
| Multi phase structure thermoplastic resin (A') | 67 | — | — | 71 | — | — |
| Multi phase structure thermoplastic resin (B') | — | 67 | — | — | 71 | — |
| Multi phase structure thermoplastic resin (C') | — | — | 67 | — | — | 71 |
| Non-polar α-olefin polymer: | | | | | | |
| Low density polyethylene (% by weight) | 33 | 33 | 33 | — | — | — |
| Vinyl Polymer: | | | | | | |
| Vinyl polymer i (% by weight) | — | — | — | 29 | — | — |
| Vinyl polymer ii (% by weight) | — | — | — | — | 29 | — |
| Vinyl polymer iii (% by weight) | — | — | — | — | — | 29 |
| Diameter of dispersing resin in the multi phase resin (μm) | 0.3~0.4 | 0.2~0.3 | 0.4~0.5 | 0.4~0.5 | 0.3~0.4 | 0.4~0.5 |

Low density polyethylene: Nippon Petrochemicals Co., Ltd. "Rexlon F41", density = 0.924 g/cm$^3$,
A prime attatched to the symbol of the multi phase structure thermoplastic resin indicates that the resin was not blended by extrusion.

TABLE 3

| | Reference Example No. | | | | | |
|---|---|---|---|---|---|---|
| | 19 | | 20 | | 21 | |
| Symbol of multi phase structure thermoplastic resin | P | Q | R | S | T | U |
| Non-polar α-olefin polymer: | | | | | | |
| Low density polyethylene | 700 g | | 700 g | | 700 g | |
| Vinyl monomer: | | | | | | |
| Styrene monomer | 210 g | | — | | 300 g | |
| Acrylo nitrile monomer | 90 g | | — | | — | |
| Methyl methacrylate monomer | — | | 300 g | | — | |
| Molecular weight adjusting agent n-dodecil melcaptan | — | | 0.6 g | | — | |
| Blending by melting extrusion | No | Yes | No | Yes | No | Yes |
| Mean number degree of polymerization of the vinyl polymer | 860 | | 710 | | 830 | |
| Diameter of dispersing resin in the multi phase resin | 0.3~0.4 | 0.4~0.5 | 0.3~0.4 | 0.4~0.5 | 0.3~0.4 | 0.4~0.5 |

Low density polyethylene: Nippon Petrochemicals Co., Ltd. "Rexlon F41" density = 0.924 g/cm$^3$,

TABLE 4

| | Reference Example No. | | | | | |
|---|---|---|---|---|---|---|
| | 22 | 23 | 24 | 25 | 26 | 27 |
| Symbol of Multi phase structure thermoplastic Resin | V | W | X | Y | Z | a |
| Multi phase structure thermoplastic: (% by weight) | | | | | | |
| Multi phase structure thermoplastic resin (P) | 67 | — | — | 71 | — | — |
| Multi phase structure thermoplastic resin (R) | — | 67 | — | — | 71 | — |
| Multi phase structure thermoplastic resin (T) | — | — | 67 | — | — | 71 |
| Non-polar α-olefin polymer: | | | | | | |

TABLE 4-continued

| | Reference Example No. | | | | | |
|---|---|---|---|---|---|---|
| | 22 | 23 | 24 | 25 | 26 | 27 |
| Low density polyethylene (% by weight) | 33 | 33 | 33 | — | — | — |
| Vinyl Polymer: | | | | | | |
| Vinyl polymer i (% by weight) | — | — | — | 29 | — | — |
| Vinyl polymer ii (% by weight) | — | — | — | — | 29 | — |
| Vinyl polymer iii (% by weight) | — | — | — | — | — | 29 |
| Diameter of dispersing resin in the multi phase resin (μm) | 0.5~0.6 | 0.4~0.5 | 0.4~0.5 | 0.5~0.6 | 0.4~0.5 | 0.4~0.5 |

Low density polyethylene: Nippon Petrochemicals Co., Ltd. "Rexlon F41", density = 0.924 g/cm$^3$,

TABLE 5

| | Reference Example No. | | | | | | | |
|---|---|---|---|---|---|---|---|---|
| | 28 | 29 | 30 | 31 | 32 | 33 | 34 | 35 |
| Symbol of Multi phase structure thermoplastic Resin | b | c | d | e | f | g | h | i |
| Multi phase structure thermoplastic: (% by weight) | | | | | | | | |
| Multi phase structure thermoplastic resin (A) | 99.9 | 50 | 80 | 80 | 80 | — | — | — |
| Multi phase structure thermoplastic resin (P) | — | — | — | — | — | 80 | — | — |
| Multi phase structure thermoplastic resin (R) | — | — | — | — | — | — | 80 | — |
| Multi phase structure thermoplastic resin (T) | — | — | — | — | — | — | — | 80 |
| Lubricating material: | | | | | | | | |
| Stearyl stearate (% by weight) | 0.1 | 50 | 20 | — | — | 20 | 20 | 20 |
| Mineral oil | — | — | — | 20 | — | — | — | — |
| Dimethyl polysiloxane (% by weight) | — | — | — | — | 20 | — | — | — |

TABLE 6

| | Example No. | | | | | | | | | |
|---|---|---|---|---|---|---|---|---|---|---|
| | 1 | 2 | 3 | 4 | 5 | 6 | 7 | 8 | 9 | 10 |
| Polyoxymethylene (% by weight) | 95 | 80 | 50 | 80 | 80 | 80 | 80 | 80 | 80 | 80 |
| Multi phase structure thermoplastic resin B (% by weight) | 5 | 20 | 50 | — | — | — | — | — | — | — |
| Multi phase structure thermoplastic resin A (% by weight) | — | — | — | 20 | — | — | — | — | — | — |
| Multi phase structure thermoplastic resin D (% by weight) | — | — | — | — | 20 | — | — | — | — | — |
| Multi phase structure thermoplastic resin F (% by weight) | — | — | — | — | — | 20 | — | — | — | — |
| Multi phase structure thermoplastic resin H (% by weight) | — | — | — | — | — | — | 20 | — | — | — |
| Multi phase structure thermoplastic resin B' (% by weight) | — | — | — | — | — | — | — | 20 | — | — |
| Multi phase structure thermoplastic resin K (% by weight) | — | — | — | — | — | — | — | — | 20 | — |
| Multi phase structure thermoplastic resin N (% by weight) | — | — | — | — | — | — | — | — | — | 20 |
| Multi phase structure thermoplastic resin R (% by weight) | — | — | — | — | — | — | — | — | — | — |
| Multi phase structure thermoplastic resin S (% by weight) | — | — | — | — | — | — | — | — | — | — |
| Multi phase structure thermoplastic resin W (% by weight) | — | — | — | — | — | — | — | — | — | — |
| Multi phase structure thermoplastic resin Z (% by weight) | — | — | — | — | — | — | — | — | — | — |
| Multi phase structure thermoplastic resin b (% by weight) | — | — | — | — | — | — | — | — | — | — |
| Multi phase structure thermoplastic resin c (% by weight) | — | — | — | — | — | — | — | — | — | — |
| Multi phase structure thermoplastic resin d (% by weight) | — | — | — | — | — | — | — | — | — | — |
| Multi phase structure thermoplastic resin e (% by weight) | — | — | — | — | — | — | — | — | — | — |
| Multi phase structure thermoplastic resin f (% by weight) | — | — | — | — | — | — | — | — | — | — |
| Multi phase structure thermoplastic resin h (% by weight) | — | — | — | — | — | — | — | — | — | — |
| Dynamic friction coefficient | 0.16 | 0.19 | 0.18 | 0.19 | 0.17 | 0.16 | 0.18 | 0.21 | 0.20 | 0.20 |
| Tensile Strength (kgf/mm 2) | 5.5 | 4.2 | 3.3 | 4.3 | 4.5 | 5.0 | 4.6 | 4.0 | 3.8 | 3.7 |
| Flexual modulus (kgf/mm 2) | 211 | 192 | 174 | 190 | 215 | 220 | 188 | 185 | 182 | 179 |
| Heat deflection temperature | 101 | 95 | 75 | 97 | 97 | 99 | 96 | 92 | 90 | 87 |
| Appearance of injection mold | good | good | good | good | good | good | good | good | good | good |

| | Example No. | | | | | | | | | |
|---|---|---|---|---|---|---|---|---|---|---|
| | 11 | 12 | 13 | 14 | 15 | 16 | 17 | 18 | 19 | 20 |
| Polyoxymethylene (% by weight) | 80 | 80 | 80 | 80 | 80 | 80 | 80 | 80 | 80 | 80 |
| Multi phase structure thermoplastic resin B (% by weight) | — | — | — | — | — | — | — | — | — | — |

TABLE 6-continued

| | | | | | | | | | | |
|---|---|---|---|---|---|---|---|---|---|---|
| Multi phase structure thermoplastic resin A (% by weight) | — | — | — | — | — | — | — | — | — | — |
| Multi phase structure thermoplastic resin D (% by weight) | — | — | — | — | — | — | — | — | — | — |
| Multi phase structure thermoplastic resin F (% by weight) | — | — | — | — | — | — | — | — | — | — |
| Multi phase structure thermoplastic resin H (% by weight) | — | — | — | — | — | — | — | — | — | — |
| Multi phase structure thermoplastic resin B' (% by weight) | — | — | — | — | — | — | — | — | — | — |
| Multi phase structure thermoplastic resin K (% by weight) | — | — | — | — | — | — | — | — | — | — |
| Multi phase structure thermoplastic resin N (% by weight) | — | — | — | — | — | — | — | — | — | — |
| Multi phase structure thermoplastic resin R (% by weight) | 20 | — | — | — | — | — | — | — | — | — |
| Multi phase structure thermoplastic resin S (% by weight) | — | 20 | — | — | — | — | — | — | — | — |
| Multi phase structure thermoplastic resin W (% by weight) | — | — | 20 | — | — | — | — | — | — | — |
| Multi phase structure thermoplastic resin Z (% by weight) | — | — | — | 20 | — | — | — | — | — | — |
| Multi phase structure thermoplastic resin b (% by weight) | — | — | — | — | 20 | — | — | — | — | — |
| Multi phase structure thermoplastic resin c (% by weight) | — | — | — | — | — | 20 | — | — | — | — |
| Multi phase structure thermoplastic resin d (% by weight) | — | — | — | — | — | — | 20 | — | — | — |
| Multi phase structure thermoplastic resin e (% by weight) | — | — | — | — | — | — | — | 20 | — | — |
| Multi phase structure thermoplastic resin f (% by weight) | — | — | — | — | — | — | — | — | 20 | — |
| Multi phase structure thermoplastic resin h (% by weight) | — | — | — | — | — | — | — | — | — | 20 |
| Dynamic friction coefficient | 0.22 | 0.23 | 0.23 | 0.24 | 0.18 | 0.15 | 0.16 | 0.16 | 0.16 | 0.20 |
| Tensile Strength (kgf/mm 2) | 3.9 | 3.8 | 3.7 | 3.5 | 4.3 | 4.0 | 4.1 | 4.1 | 4.1 | 3.7 |
| Flexual modulus (kgf/mm 2) | 180 | 179 | 179 | 172 | 190 | 185 | 188 | 187 | 188 | 177 |
| Heat deflection temperature | 90 | 90 | 87 | 85 | 97 | 90 | 95 | 94 | 95 | 87 |
| Appearance of injection mold | good | good | good | good | good | good | good | good | good | good |

TABLE 7

| | Comparative Example No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Polyoxymethylene (% by weight) | 100 | 99.9 | 40 | 40 | 40 | 40 | 40 | 40 | 40 | 40 | 95 | 80 | 50 | 80 | 80 | 80 |
| Multi phase structure thermoplastic resin B (% by weight) | — | 0.1 | 60 | — | — | — | — | — | — | — | — | — | — | — | — | — |
| Multi phase structure thermoplastic resin A (% by weight) | — | — | — | 60 | — | — | — | — | — | — | — | — | — | — | — | — |
| Multi phase structure thermoplastic resin D (% by weight) | — | — | — | — | 60 | — | — | — | — | — | — | — | — | — | — | — |
| Multi phase structure thermoplastic resin F (% by weight) | — | — | — | — | — | 60 | — | — | — | — | — | — | — | — | — | — |
| Multi phase structure thermoplastic resin H (% by weight) | — | — | — | — | — | — | 60 | — | — | — | — | — | — | — | — | — |
| Multi phase structure thermoplastic resin S (% by weight) | — | — | — | — | — | — | — | 60 | — | — | — | — | — | — | — | — |
| Multi phase structure thermoplastic resin d (% by weight) | — | — | — | — | — | — | — | — | 60 | — | — | — | — | — | — | — |
| Multi phase structure thermoplastic resin h (% by weight) | — | — | — | — | — | — | — | — | — | 60 | — | — | — | — | — | — |
| Low density polyethylene "RexlonF41" (% by weight) | — | — | — | — | — | — | — | — | — | — | 5 | 20 | 50 | — | — | — |
| High density polyethylene "StaflenE780" (% by weight) | — | — | — | — | — | — | — | — | — | — | — | — | — | 20 | — | — |
| Ultra high molecular weight polyethylene "LubmerL4000" (% by weight) | — | — | — | — | — | — | — | — | — | — | — | — | — | — | 20 | — |
| Linear low density polyethylene "LinilexAJ5310" (% by weight) | — | — | — | — | — | — | — | — | — | — | — | — | — | — | — | 20 |
| Dynamic friction coefficient | 0.38 | 0.39 | 0.18 | 0.18 | 0.16 | 0.15 | 0.17 | 0.20 | 0.17 | 0.18 | 0.25 | 0.25 | (*1) | (1*) | (*1) | 0.23 |
| Tensile Strength (kgf/mm 2) | 5.8 | 5.8 | 2.7 | 2.8 | 2.9 | 2.9 | 2.8 | 2.5 | 2.4 | 2.3 | 4.8 | 3.5 | — | — | — | 3.6 |
| Flexual modulus (kgf/mm 2) | 218 | 217 | 152 | 157 | 160 | 163 | 155 | 145 | 150 | 142 | 195 | 150 | — | — | — | 155 |
| Heat deflection temperature | 107 | 107 | 57 | 60 | 63 | 65 | 60 | 52 | 55 | 50 | 90 | 81 | — | — | — | 82 |

TABLE 7-continued

| | Comparative Example No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Appearance of injection mold | good | good | *A | *A | *A | *A | *A | *A | *A | *A | *B | *C | — | — | — | *C |

(*1) No sample was prepared because it was impossible to make a strand by extrusion.
*A: Slight layer separation was observed.
*B: Layer separation was observed.
*C: Strong layer separation was observed.

TABLE 8

(unit is expressed by part by weight)

| | Example No. | | | | | | | | | | | | |
|---|---|---|---|---|---|---|---|---|---|---|---|---|---|
| | 21 | 22 | 23 | 24 | 25 | 26 | 27 | 28 | 29 | 30 | 31 | 32 | 33 |
| Polycarbonate resin | 100 | 100 | 100 | 100 | 100 | 100 | 100 | 100 | 100 | 100 | 100 | 100 | 100 |
| Multi phase structure thermoplastic resin A | 10 | 5 | 100 | — | — | — | — | — | — | — | — | — | — |
| Multi phase structure thermoplastic resin B | — | — | — | 10 | — | — | — | — | — | — | — | — | — |
| Multi phase structure thermoplastic resin D | — | — | — | — | 10 | — | — | — | — | — | — | — | — |
| Multi phase structure thermoplastic resin F | — | — | — | — | — | 10 | — | — | — | — | — | — | — |
| Multi phase structure thermoplastic resin H | — | — | — | — | — | — | 10 | — | — | — | — | — | — |
| Multi phase structure thermoplastic resin A' | — | — | — | — | — | — | — | 10 | — | — | — | — | — |
| Multi phase structure thermoplastic resin J | — | — | — | — | — | — | — | — | 10 | — | — | — | — |
| Multi phase structure thermoplastic resin M | — | — | — | — | — | — | — | — | — | 10 | — | — | — |
| Multi phase structure thermoplastic resin P | — | — | — | — | — | — | — | — | — | — | 10 | — | — |
| Multi phase structure thermoplastic resin Q | — | — | — | — | — | — | — | — | — | — | — | 10 | — |
| Multi phase structure thermoplastic resin V | — | — | — | — | — | — | — | — | — | — | — | — | 10 |
| Multi phase structure thermoplastic resin Y | — | — | — | — | — | — | — | — | — | — | — | — | — |
| Multi phase structure thermoplastic resin b | — | — | — | — | — | — | — | — | — | — | — | — | — |
| Multi phase structure thermoplastic resin c | — | — | — | — | — | — | — | — | — | — | — | — | — |
| Multi phase structure thermoplastic resin d | — | — | — | — | — | — | — | — | — | — | — | — | — |
| Multi phase structure thermoplastic resin e | — | — | — | — | — | — | — | — | — | — | — | — | — |
| Multi phase structure thermoplastic resin f | — | — | — | — | — | — | — | — | — | — | — | — | — |
| Multi phase structure thermoplastic resin g | — | — | — | — | — | — | — | — | — | — | — | — | — |
| Glass fiber | — | — | — | — | — | — | — | — | — | — | — | — | — |
| Dynamic friction coefficient | 0.21 | 0.30 | 0.23 | 0.24 | 0.20 | 0.19 | 0.20 | 0.22 | 0.23 | 0.24 | 0.24 | 0.26 | 0.26 |
| Tensile Strength (kgf/mm 2) | 7.3 | 7.6 | 6.6 | 7.1 | 7.5 | 7.7 | 7.4 | 7.1 | 7.0 | 7.1 | 7.1 | 6.9 | 6.7 |
| Flexural modulus (kgf/mm 2) | 202 | 206 | 188 | 201 | 205 | 211 | 203 | 198 | 195 | 198 | 198 | 196 | 190 |
| Heat deflection temperature | 122 | 127 | 112 | 119 | 124 | 125 | 121 | 120 | 118 | 119 | 118 | 116 | 115 |
| Appearance of injection mold | good | good | good | good | good | good | good | good | good | good | good | good | good |

| | Example No. | | | | | | | | | | | | |
|---|---|---|---|---|---|---|---|---|---|---|---|---|---|
| | 34 | 35 | 36 | 37 | 38 | 39 | 40 | 41 | 42 | 43 | 44 | 45 | 46 |
| Polycarbonate resin | 100 | 100 | 100 | 100 | 100 | 100 | 100 | 100 | 100 | 100 | 100 | 100 | 100 |
| Multi phase structure thermoplastic resin A | — | — | — | — | — | — | — | 10 | — | — | — | — | — |
| Multi phase structure thermoplastic resin B | — | — | — | — | — | — | — | — | 10 | — | — | — | — |
| Multi phase structure thermoplastic resin D | — | — | — | — | — | — | — | — | — | 10 | — | — | — |
| Multi phase structure thermoplastic resin F | — | — | — | — | — | — | — | — | — | — | 10 | — | — |
| Multi phase structure thermoplastic resin H | — | — | — | — | — | — | — | — | — | — | — | 10 | — |
| Multi phase structure thermoplastic resin A' | — | — | — | — | — | — | — | — | — | — | — | — | — |
| Multi phase structure thermoplastic resin J | — | — | — | — | — | — | — | — | — | — | — | — | — |
| Multi phase structure thermoplastic resin M | — | — | — | — | — | — | — | — | — | — | — | — | — |
| Multi phase structure thermoplastic resin P | — | — | — | — | — | — | — | — | — | — | — | — | — |
| Multi phase structure thermoplastic resin Q | — | — | — | — | — | — | — | — | — | — | — | — | 10 |
| Multi phase structure thermoplastic resin V | — | — | — | — | — | — | — | — | — | — | — | — | — |
| Multi phase structure thermoplastic resin Y | 10 | — | — | — | — | — | — | — | — | — | — | — | — |
| Multi phase structure thermoplastic resin b | — | 10 | — | — | — | — | — | — | — | — | — | — | — |
| Multi phase structure thermoplastic resin c | — | — | 10 | — | — | — | — | — | — | — | — | — | — |
| Multi phase structure thermoplastic resin d | — | — | — | 10 | — | — | — | — | — | — | — | — | — |
| Multi phase structure thermoplastic resin e | — | — | — | — | 10 | — | — | — | — | — | — | — | — |
| Multi phase structure thermoplastic resin f | — | — | — | — | — | 10 | — | — | — | — | — | — | — |
| Multi phase structure thermoplastic resin g | — | — | — | — | — | — | 10 | — | — | — | — | — | — |
| Glass fiber | — | — | — | — | — | — | — | 50 | 50 | 50 | 50 | 50 | 50 |
| Dynamic friction coefficient | 0.26 | 0.20 | 0.17 | 0.19 | 0.19 | 0.19 | 0.22 | 0.25 | 0.24 | 0.25 | 0.26 | 0.25 | 0.29 |
| Tensile Strength (kgf/mm 2) | 6.8 | 7.3 | 7.1 | 7.2 | 7.2 | 7.2 | 6.9 | 12.4 | 12.1 | 12.5 | 12.5 | 12.2 | 11.8 |
| Flexural modulus (kgf/mm 2) | 193 | 201 | 195 | 199 | 197 | 198 | 194 | 781 | 778 | 780 | 780 | 770 | 765 |
| Heat deflection temperature | 117 | 122 | 116 | 120 | 119 | 120 | 114 | 137 | 133 | 140 | 139 | 136 | 133 |
| Appearance of injection mold | good | good | good | good | good | good | good | good | good | good | good | good | good |

TABLE 9

(Unit is expressed by part by weight)

| | Comparative Example No. | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Polyoxymethylene | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — |
| Multi phase structure thermoplastic resin B | — | — | — | 150 | — | — | — | — | — | — | — | — | — | — | — | — |
| Multi phase structure thermo- | — | — | — | — | 150 | — | — | — | — | — | — | — | — | — | — | — |

TABLE 9-continued (Unit is expressed by part by weight)

| | Comparative Example No. | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| plastic resin D | | | | | | | | | | | | | | | | |
| Multi phase structure thermoplastic resin F | — | — | — | — | — | 150 | — | — | — | — | — | — | — | — | — | — |
| Multi phase structure thermoplastic resin H | — | — | — | — | — | — | 150 | — | — | — | — | — | — | — | — | — |
| Multi phase structure thermoplastic resin Q | — | — | — | — | — | — | — | 150 | — | — | — | — | — | — | — | — |
| Multi phase structure thermoplastic resin d | — | — | — | — | — | — | — | — | 150 | — | — | — | — | — | — | — |
| Multi phase structure thermoplastic resin g | — | — | — | — | — | — | — | — | — | 150 | — | — | — | — | — | — |
| Low density polyethylene "RexlonF41" | — | — | — | — | — | — | — | — | — | — | 10 | 5 | 100 | — | — | — |
| High density polyethylene "StaflenE780" | — | — | — | — | — | — | — | — | — | — | — | — | — | 10 | — | — |
| Ultra high molecular weight polyethy-lene "LubmerL4000" | — | — | — | — | — | — | — | — | — | — | — | — | — | — | 10 | — |
| Linear low density polyethylene "LinilexAJ5310" | — | — | — | — | — | — | — | — | — | — | — | — | — | — | — | 10 |
| Dynamic friction coefficient | 0.62 | 0.61 | 0.25 | 0.26 | 0.27 | 0.26 | 0.25 | 0.28 | 0.23 | 0.26 | 0.30 | 0.33 | (*1) | (1*) | (*1) | 0.31 |
| Tensile Strength (kgf/mm 2) | 8.0 | 8.0 | 5.8 | 5.7 | 5.6 | 6.0 | 6.2 | 5.5 | 5.5 | 5.1 | 6.5 | 7.1 | — | — | — | 6.6 |
| Flexual modulus (kgf/mm 2) | 215 | 217 | 166 | 162 | 163 | 170 | 173 | 154 | 160 | 150 | 161 | 170 | — | — | — | 165 |
| Heat deflection temperature (°C.) | 132 | 133 | 101 | 99 | 100 | 101 | 103 | 97 | 96 | 92 | 113 | 122 | — | — | — | 110 |
| Appearance of injection mold | good | good | *A | *A | *A | *A | *A | *A | *A | *A | *A | *B | *C | — | — | *C |

(*1) No sample was prepared because it was impossible to make a strand by extrusion.
*A: Slight layer separation was observed.
*B: Layer separation was observed.
*C: Strong layer separation was observed.

TABLE 10

(Unit is expressed by part by weight)

| | Example No. | | | | | | | | | | | | |
|---|---|---|---|---|---|---|---|---|---|---|---|---|---|
| | 47 | 48 | 49 | 50 | 51 | 52 | 53 | 54 | 55 | 56 | 57 | 58 | 59 |
| A-B-S copolymer resin | 100 | 100 | 100 | 100 | 100 | 100 | 100 | 100 | 100 | 100 | 100 | 100 | 100 |
| High impact polyethylene | — | — | — | — | — | — | — | — | — | — | — | — | — |
| General-purpose polystyrene | — | — | — | — | — | — | — | — | — | — | — | — | — |
| Multi phase structure resin A | 10 | 5 | 100 | — | — | — | — | — | — | — | — | — | — |
| Multi phase structure resin C | — | — | — | 10 | — | — | — | — | — | — | — | — | — |
| Multi phase structure resin B | — | — | — | — | 10 | — | — | — | — | — | — | — | — |
| Multi phase structure resin D | — | — | — | — | — | 10 | — | — | — | — | — | — | — |
| Multi phase structure resin F | — | — | — | — | — | — | 10 | — | — | — | — | — | — |
| Multi phase structure resin H | — | — | — | — | — | — | — | 10 | — | — | — | — | — |
| Multi phase structure resin A' | — | — | — | — | — | — | — | — | 10 | — | — | — | — |
| Multi phase structure resin J | — | — | — | — | — | — | — | — | — | 10 | — | — | — |
| Multi phase structure resin M | — | — | — | — | — | — | — | — | — | — | 10 | — | — |
| Multi phase structure resin P | — | — | — | — | — | — | — | — | — | — | — | 10 | — |
| Multi phase structure resin Q | — | — | — | — | — | — | — | — | — | — | — | — | 10 |
| Multi phase structure resin V | — | — | — | — | — | — | — | — | — | — | — | — | — |
| Multi phase structure resin Y | — | — | — | — | — | — | — | — | — | — | — | — | — |
| Multi phase structure resin b | — | — | — | — | — | — | — | — | — | — | — | — | — |
| Multi phase structure resin c | — | — | — | — | — | — | — | — | — | — | — | — | — |
| Multi phase structure resin d | — | — | — | — | — | — | — | — | — | — | — | — | — |
| Multi phase structure resin e | — | — | — | — | — | — | — | — | — | — | — | — | — |
| Multi phase structure resin f | — | — | — | — | — | — | — | — | — | — | — | — | — |
| Multi phase structure resin g | — | — | — | — | — | — | — | — | — | — | — | — | — |
| Glass fiber | — | — | — | — | — | — | — | — | — | — | — | — | — |
| Dynamic friction coefficient | 0.21 | 0.25 | 0.23 | 0.22 | 0.23 | 0.20 | 0.20 | 0.22 | 0.24 | 0.22 | 0.24 | 0.25 | 0.26 |
| Tensile Strength (kgf/mm 2) | 4.0 | 4.1 | 3.5 | 3.9 | 3.8 | 4.1 | 4.2 | 3.9 | 3.9 | 3.8 | 4.1 | 3.8 | 3.7 |
| Flexual modulus (kgf/mm 2) | 248 | 251 | 236 | 244 | 246 | 250 | 258 | 247 | 245 | 243 | 254 | 243 | 243 |
| Heat deflection temperature | 88 | 90 | 80 | 86 | 84 | 85 | 86 | 87 | 85 | 85 | 92 | 84 | 83 |
| Appearance of injection mold | good | good | good | good | good | good | good | good | good | good | good | good | good |

| | Example No. | | | | | | | | | | | | |
|---|---|---|---|---|---|---|---|---|---|---|---|---|---|
| | 60 | 60 | 62 | 63 | 64 | 65 | 66 | 67 | 68 | 69 | 70 | 71 | 72 |
| A-B-S copolymer resin | 100 | 100 | 100 | 100 | 100 | 100 | 100 | 100 | — | — | — | — | — |
| High impact polyethylene | — | — | — | — | — | — | — | — | 100 | 100 | 100 | 100 | 100 |
| General-purpose polystyrene | — | — | — | — | — | — | — | — | — | — | — | — | — |
| Multi phase structure resin A | — | — | — | — | — | — | — | — | 10 | — | — | — | — |
| Multi phase structure resin C | — | — | — | — | — | — | — | — | — | 10 | — | — | — |
| Multi phase structure resin B | — | — | — | — | — | — | — | — | — | — | 10 | — | — |
| Multi phase structure resin D | — | — | — | — | — | — | — | — | — | — | — | 10 | — |
| Multi phase structure resin F | — | — | — | — | — | — | — | — | — | — | — | — | 10 |
| Multi phase structure resin H | — | — | — | — | — | — | — | — | — | — | — | — | — |
| Multi phase structure resin A' | — | — | — | — | — | — | — | — | — | — | — | — | — |

TABLE 10-continued (Unit is expressed by part by weight)

| | | | | | | | | | | | | | |
|---|---|---|---|---|---|---|---|---|---|---|---|---|---|
| Multi phase structure resin J | — | — | — | — | — | — | — | — | — | — | — | — | — |
| Multi phase structure resin M | — | — | — | — | — | — | — | — | — | — | — | — | — |
| Multi phase structure resin P | — | — | — | — | — | — | — | — | — | — | — | — | — |
| Multi phase structure resin Q | — | — | — | — | — | — | — | — | — | — | — | — | — |
| Multi phase structure resin V | 10 | — | — | — | — | — | — | — | — | — | — | — | — |
| Multi phase structure resin Y | — | 10 | — | — | — | — | — | — | — | — | — | — | — |
| Multi phase structure resin b | — | — | 10 | — | — | — | — | — | — | — | — | — | — |
| Multi phase structure resin c | — | — | — | 10 | — | — | — | — | — | — | — | — | — |
| Multi phase structure resin d | — | — | — | — | 10 | — | — | — | — | — | — | — | — |
| Multi phase structure resin e | — | — | — | — | — | 10 | — | — | — | — | — | — | — |
| Multi phase structure resin f | — | — | — | — | — | — | 10 | — | — | — | — | — | — |
| Multi phase structure resin g | — | — | — | — | — | — | — | 10 | — | — | — | — | — |
| Glass fiber | — | — | — | — | — | — | — | — | — | — | — | — | — |
| Dynamic friction coefficient | 0.25 | 0.26 | 0.20 | 0.17 | 0.19 | 0.19 | 0.18 | 0.22 | 0.23 | 0.24 | 0.25 | 0.22 | 0.22 |
| Tensile Strength (kgf/mm 2) | 3.6 | 3.9 | 4.0 | 3.7 | 3.9 | 3.8 | 3.9 | 3.5 | 3.5 | 3.6 | 3.4 | 3.6 | 3.7 |
| Flexual modulus (kgf/mm 2) | 238 | 245 | 246 | 241 | 243 | 244 | 243 | 238 | 277 | 274 | 275 | 279 | 285 |
| Heat deflection temperature | 82 | 87 | 87 | 83 | 85 | 86 | 84 | 80 | 74 | 71 | 69 | 71 | 72 |
| Appearance of injection mold | good | good | good | good | good | good | good | good | good | good | good | good | good |

| | Example No. | | | | | | | | | | | | |
|---|---|---|---|---|---|---|---|---|---|---|---|---|---|
| | 73 | 74 | 75 | 76 | 77 | 78 | 79 | 80 | 81 | 82 | 83 | 84 | 85 |
| A-B-S copolymer resin | — | — | — | — | — | — | — | — | — | — | — | — | — |
| High impact polyethylene | 100 | 100 | 100 | 100 | 100 | 100 | — | — | — | — | — | — | — |
| General-purpose polystyrene | — | — | — | — | — | — | 100 | 100 | 100 | 100 | 100 | 100 | 100 |
| Multi phase structure resin A | — | — | — | — | — | — | 10 | — | — | — | — | — | — |
| Multi phase structure resin C | — | — | — | — | — | — | — | 10 | — | — | — | — | — |
| Multi phase structure resin B | — | — | — | — | — | — | — | — | 10 | — | — | — | — |
| Multi phase structure resin D | — | — | — | — | — | — | — | — | — | 10 | — | — | — |
| Multi phase structure resin F | — | — | — | — | — | — | — | — | — | — | 10 | — | — |
| Multi phase structure resin H | 10 | — | — | — | — | — | — | — | — | — | — | 10 | — |
| Multi phase structure resin A' | — | — | — | — | — | — | — | — | — | — | — | — | — |
| Multi phase structure resin J | — | — | — | — | — | — | — | — | — | — | — | — | — |
| Multi phase structure resin M | — | — | — | — | — | — | — | — | — | — | — | — | — |
| Multi phase structure resin P | — | — | — | — | — | — | — | — | — | — | — | — | — |
| Multi phase structure resin Q | — | 10 | — | — | — | — | — | — | — | — | — | — | 10 |
| Multi phase structure resin V | — | — | — | — | — | — | — | — | — | — | — | — | — |
| Multi phase structure resin Y | — | — | — | — | — | — | — | — | — | — | — | — | — |
| Multi phase structure resin b | — | — | — | — | — | — | — | — | — | — | — | — | — |
| Multi phase structure resin c | — | — | — | — | — | — | — | — | — | — | — | — | — |
| Multi phase structure resin d | — | — | 10 | — | — | — | — | — | — | — | — | — | — |
| Multi phase structure resin e | — | — | — | 10 | — | — | — | — | — | — | — | — | — |
| Multi phase structure resin f | — | — | — | — | 10 | — | — | — | — | — | — | — | — |
| Multi phase structure resin g | — | — | — | — | — | 10 | — | — | — | — | — | — | — |
| Glass fiber | — | — | — | — | — | — | — | — | — | — | — | — | — |
| Dynamic friction coefficient | 0.24 | 0.28 | 0.20 | 0.21 | 0.20 | 0.25 | 0.24 | 0.24 | 0.26 | 0.23 | 0.24 | 0.23 | 0.29 |
| Tensile Strength (kgf/mm 2) | 3.5 | 3.3 | 3.3 | 3.2 | 3.3 | 3.0 | 4.7 | 4.6 | 4.5 | 4.7 | 4.8 | 4.5 | 4.4 |
| Flexual modulus (kgf/mm 2) | 278 | 268 | 270 | 271 | 272 | 265 | 385 | 384 | 387 | 390 | 394 | 388 | 378 |
| Heat deflection temperature | 74 | 67 | 71 | 72 | 71 | 65 | 78 | 76 | 73 | 76 | 77 | 79 | 71 |
| Appearance of injection mold | good | good | good | good | good | good | good | good | good | good | good | good | good |

| | Example No. | | | | | | | | | | | | |
|---|---|---|---|---|---|---|---|---|---|---|---|---|---|
| | 86 | 87 | 88 | 89 | 90 | 91 | 92 | 93 | 94 | 95 | 96 | 97 | 98 |
| A-B-S copolymer resin | — | — | — | — | 100 | 100 | 100 | 100 | 100 | 100 | 100 | 100 | 100 |
| High impact polyethylene | — | — | — | — | — | — | — | — | — | — | — | — | — |
| General-purpose polystyrene | 100 | 100 | 100 | 100 | — | — | — | — | — | — | — | — | — |
| Multi phase structure resin A | — | — | — | — | 10 | — | — | — | — | — | — | — | — |
| Multi phase structure resin C | — | — | — | — | — | 10 | — | — | — | — | — | — | — |
| Multi phase structure resin B | — | — | — | — | — | — | 10 | — | — | — | — | — | — |
| Multi phase structure resin D | — | — | — | — | — | — | — | 10 | — | — | — | — | — |
| Multi phase structure resin F | — | — | — | — | — | — | — | — | 10 | — | — | — | — |
| Multi phase structure resin H | — | — | — | — | — | — | — | — | — | 10 | — | — | — |
| Multi phase structure resin A' | — | — | — | — | — | — | — | — | — | — | — | — | — |
| Multi phase structure resin J | — | — | — | — | — | — | — | — | — | — | — | — | — |
| Multi phase structure resin M | — | — | — | — | — | — | — | — | — | — | — | — | — |
| Multi phase structure resin P | — | — | — | — | — | — | — | — | — | — | — | — | — |
| Multi phase structure resin Q | — | — | — | — | — | — | — | — | — | — | 10 | — | — |
| Multi phase structure resin V | — | — | — | — | — | — | — | — | — | — | — | — | — |
| Multi phase structure resin Y | — | — | — | — | — | — | — | — | — | — | — | — | — |
| Multi phase structure resin b | — | — | — | — | — | — | — | — | — | — | — | — | — |
| Multi phase structure resin c | — | — | — | — | — | — | — | — | — | — | — | — | — |
| Multi phase structure resin d | 10 | — | — | — | — | — | — | — | — | — | — | 10 | — |
| Multi phase structure resin e | — | 10 | — | — | — | — | — | — | — | — | — | — | — |
| Multi phase structure resin f | — | — | 10 | — | — | — | — | — | — | — | — | — | — |
| Multi phase structure resin g | — | — | — | 10 | — | — | — | — | — | — | — | — | 10 |
| Glass fiber | — | — | — | — | 25 | 25 | 25 | 25 | 25 | 25 | 25 | 25 | 25 |
| Dynamic friction coefficient | 0.22 | 0.22 | 0.21 | 0.26 | 0.28 | 0.29 | 0.29 | 0.26 | 0.27 | 0.29 | 0.31 | 0.25 | 0.27 |
| Tensile Strength (kgf/mm 2) | 4.4 | 4.5 | 4.5 | 4.1 | 9.5 | 9.4 | 9.4 | 9.6 | 9.7 | 9.5 | 9.2 | 9.3 | 9.1 |
| Flexual modulus (kgf/mm 2) | 382 | 381 | 382 | 370 | 571 | 560 | 566 | 578 | 593 | 555 | 568 | 565 | 562 |
| Heat deflection temperature | 75 | 74 | 75 | 67 | 97 | 96 | 95 | 97 | 98 | 97 | 94 | 96 | 92 |

TABLE 10-continued (Unit is expressed by part by weight)

| | | | | | | | | | | | | | |
|---|---|---|---|---|---|---|---|---|---|---|---|---|---|
| Appearance of injection mold | good | good | good | good | good | good | good | good | good | good | good | good | good |

TABLE 11

(Unit is expressed by part by weight)

| | Comparative Example No. | | | | | | | | | | | | | | | | |
|---|---|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 | 48 | 49 |
| A-B-S copolymer resin | 100 | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — | — |
| Multi phase structure thermoplastic resin C | — | — | — | 150 | — | — | — | — | — | — | — | — | — | — | — | — | — |
| Multi phase structure thermoplastic resin B | — | — | — | — | 150 | — | — | — | — | — | — | — | — | — | — | — | — |
| Multi phase structure thermoplastic resin D | — | — | — | — | — | 150 | — | — | — | — | — | — | — | — | — | — | — |
| Multi phase structure thermoplastic resin F | — | — | — | — | — | — | 150 | — | — | — | — | — | — | — | — | — | — |
| Multi phase structure thermoplastic resin H | — | — | — | — | — | — | — | 150 | — | — | — | — | — | — | — | — | — |
| Multi phase structure thermoplastic resin Q | — | — | — | — | — | — | — | — | 150 | — | — | — | — | — | — | — | — |
| Multi phase structure thermoplastic resin d | — | — | — | — | — | — | — | — | — | 150 | — | — | — | — | — | — | — |
| Multi phase structure thermoplastic resin g | — | — | — | — | — | — | — | — | — | — | 150 | — | — | — | — | — | — |
| Low density polyethylene "RexlonF41" | — | — | — | — | — | — | — | — | — | — | — | 10 | 5 | 100 | — | — | — |
| High density polyethylene "StaflenE780" | — | — | — | — | — | — | — | — | — | — | — | — | — | — | 10 | — | — |
| Ultra high molecular weight polyethylene "LubmerL4000" | — | — | — | — | — | — | — | — | — | — | — | — | — | — | — | 10 | — |
| Linear low density polyethylene "LinilexAJ5310" | — | — | — | — | — | — | — | — | — | — | — | — | — | — | — | — | 10 |
| Dynamic friction coefficient | 0.58 | 0.59 | 0.31 | 0.32 | 0.33 | 0.31 | 0.32 | 0.31 | 0.35 | 0.29 | 0.33 | 0.28 | 0.31 | (1*) | 0.27 | 0.28 | 0.29 |
| Tensile Strength (kgf/mm 2) | 4.4 | 4.4 | 2.8 | 2.7 | 2.6 | 2.6 | 2.7 | 2.5 | 2.3 | 2.6 | 2.1 | 3.4 | 3.6 | — | 3.5 | 3.4 | 3.3 |
| Flexual modulus (kgf/mm 2) | 268 | 267 | 212 | 207 | 205 | 214 | 214 | 203 | 198 | 205 | 194 | 194 | 213 | — | 206 | 208 | 192 |
| Heat deflection temperature (°C.) | 07 | 107 | 72 | 69 | 67 | 68 | 69 | 67 | 65 | 69 | 60 | 79 | 82 | — | 80 | 80 | 80 |
| Appearance of injection mold | good | good | *A | *A | *A | *A | *A | *A | *A | *A | *A | *C | *B | — | *C | *C | *C |

(*1) No sample was prepared because it was impossible to make a strand by extrusion.
*A: Slight layer separation was observed.
*B: Layer separation was observed.
*C: Strong layer separation was observed.

TABLE 12

(Unit is expressed by part by weight)

| | Example No. | | | | | | | | | | | | | |
|---|---|---|---|---|---|---|---|---|---|---|---|---|---|---|
| | 99 | 100 | 101 | 102 | 103 | 104 | 105 | 106 | 107 | 108 | 109 | 110 | 111 | 112 |
| Polybutyleneterephthalate resin | 100 | 100 | 100 | 100 | 100 | 100 | 100 | 100 | 100 | 100 | 100 | 100 | 100 | 100 |
| Polyethylenterephthalate resin | — | — | — | — | — | — | — | — | — | — | — | — | — | — |
| Multi phase structure resin A | 10 | 5 | 100 | — | — | — | — | — | — | — | — | — | — | — |
| Multi phase structure resin B | — | — | — | 10 | — | — | — | — | — | — | — | — | — | — |
| Multi phase structure resin D | — | — | — | — | 10 | — | — | — | — | — | — | — | — | — |
| Multi phase structure resin F | — | — | — | — | — | 10 | — | — | — | — | — | — | — | — |
| Multi phase structure resin H | — | — | — | — | — | — | 10 | — | — | — | — | — | — | — |
| Multi phase structure resin A' | — | — | — | — | — | — | — | 10 | — | — | — | — | — | — |
| Multi phase structure resin J | — | — | — | — | — | — | — | — | 10 | — | — | — | — | — |
| Multi phase structure resin M | — | — | — | — | — | — | — | — | — | 10 | — | — | — | — |
| Multi phase structure resin P | — | — | — | — | — | — | — | — | — | — | 10 | — | — | — |
| Multi phase structure resin Q | — | — | — | — | — | — | — | — | — | — | — | 10 | — | — |
| Multi phase structure resin V | — | — | — | — | — | — | — | — | — | — | — | — | 10 | — |
| Multi phase structure resin Y | — | — | — | — | — | — | — | — | — | — | — | — | — | 10 |
| Multi phase structure resin b | — | — | — | — | — | — | — | — | — | — | — | — | — | — |
| Multi phase structure resin c | — | — | — | — | — | — | — | — | — | — | — | — | — | — |
| Multi phase structure resin d | — | — | — | — | — | — | — | — | — | — | — | — | — | — |
| Multi phase structure resin e | — | — | — | — | — | — | — | — | — | — | — | — | — | — |
| Multi phase structure resin f | — | — | — | — | — | — | — | — | — | — | — | — | — | — |
| Multi phase structure resin g | — | — | — | — | — | — | — | — | — | — | — | — | — | — |
| Glass fiber | — | — | — | — | — | — | — | — | — | — | — | — | — | — |

TABLE 12-continued (Unit is expressed by part by weight)

|  | | | | | | | | | | | | | | | |
|---|---|---|---|---|---|---|---|---|---|---|---|---|---|---|---|
| Dynamic friction coefficient | 0.21 | 0.28 | 0.24 | 0.23 | 0.22 | 0.21 | 0.22 | 0.23 | 0.22 | 0.23 | 0.25 | 0.26 | 0.24 | 0.25 |
| Tensile Strength (kgf/mm 2) | 5.4 | 5.6 | 4.7 | 5.3 | 5.5 | 5.6 | 5.4 | 5.2 | 5.3 | 5.7 | 5.2 | 5.1 | 5.1 | 5.4 |
| Flexual modulus (kgf/mm 2) | 235 | 241 | 221 | 233 | 238 | 240 | 233 | 230 | 228 | 246 | 225 | 224 | 223 | 240 |
| Heat deflection temperature | 72 | 75 | 65 | 71 | 73 | 72 | 71 | 71 | 70 | 76 | 70 | 69 | 68 | 72 |
| Appearance of injection mold | good | good | good | good | good | good | good | good | good | good | good | good | good | good |

| | Example No. | | | | | | | | | | | | | |
|---|---|---|---|---|---|---|---|---|---|---|---|---|---|---|
| | 113 | 114 | 115 | 116 | 117 | 118 | 119 | 120 | 121 | 122 | 123 | 124 | 125 | 126 |
| Polybutyleneterephthalate resin | 100 | 100 | 100 | 100 | 100 | 100 | — | — | — | — | — | — | — | — |
| Polyethyleneterephthalate resin | — | — | — | — | — | — | 100 | 100 | 100 | 100 | 100 | 100 | 100 | 100 |
| Multi phase structure resin A | — | — | — | — | — | — | 10 | — | — | — | — | — | — | — |
| Multi phase structure resin B | — | — | — | — | — | — | — | 10 | — | — | — | — | — | — |
| Multi phase structure resin D | — | — | — | — | — | — | — | — | 10 | — | — | — | — | — |
| Multi phase structure resin F | — | — | — | — | — | — | — | — | — | 10 | — | — | — | — |
| Multi phase structure resin H | — | — | — | — | — | — | — | — | — | — | 10 | — | — | — |
| Multi phase structure resin A' | — | — | — | — | — | — | — | — | — | — | — | — | — | — |
| Multi phase structure resin J | — | — | — | — | — | — | — | — | — | — | — | — | — | — |
| Multi phase structure resin M | — | — | — | — | — | — | — | — | — | — | — | — | — | — |
| Multi phase structure resin P | — | — | — | — | — | — | — | — | — | — | — | — | — | — |
| Multi phase structure resin Q | — | — | — | — | — | — | — | — | — | — | — | 10 | — | — |
| Multi phase structure resin V | — | — | — | — | — | — | — | — | — | — | — | — | — | — |
| Multi phase structure resin Y | — | — | — | — | — | — | — | — | — | — | — | — | — | — |
| Multi phase structure resin b | 10 | — | — | — | — | — | — | — | — | — | — | — | — | — |
| Multi phase structure resin c | — | 10 | — | — | — | — | — | — | — | — | — | — | — | — |
| Multi phase structure resin d | — | — | 10 | — | — | — | — | — | — | — | — | — | 10 | — |
| Multi phase structure resin e | — | — | — | 10 | — | — | — | — | — | — | — | — | — | — |
| Multi phase structure resin f | — | — | — | — | 10 | — | — | — | — | — | — | — | — | — |
| Multi phase structure resin g | — | — | — | — | — | 10 | — | — | — | — | — | — | — | 10 |
| Glass fiber | — | — | — | — | — | — | 25 | 25 | 25 | 25 | 25 | 25 | 25 | 25 |
| Dynamic friction coefficient | 0.20 | 0.17 | 0.19 | 0.19 | 0.18 | 0.23 | 0.26 | 0.24 | 0.26 | 0.25 | 0.27 | 0.30 | 0.24 | 0.27 |
| Tensile Strength (kgf/mm 2) | 5.4 | 5.1 | 5.3 | 5.2 | 5.3 | 4.9 | 11.2 | 11.1 | 11.3 | 11.4 | 11.1 | 10.7 | 11.1 | 10.7 |
| Flexual modulus (kgf/mm 2) | 236 | 229 | 233 | 233 | 234 | 221 | 741 | 738 | 740 | 740 | 730 | 725 | 740 | 726 |
| Heat deflection temperature | 73 | 69 | 70 | 70 | 71 | 67 | 213 | 211 | 210 | 215 | 216 | 208 | 213 | 206 |
| Appearance of injection mold | good | good | good | good | good | good | good | good | good | good | good | good | good | good |

TABLE 13

(Unit is expressed by part by weight)

| | Comparative Example No. | | | | | | | | | | | | | | | |
|---|---|---|---|---|---|---|---|---|---|---|---|---|---|---|---|---|
| | 50 | 51 | 52 | 53 | 54 | 55 | 56 | 57 | 58 | 59 | 60 | 61 | 62 | 63 | 64 | 65 |
| Polybutylene terephthalate | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — |
| Multi phase structure thermoplastic resin B | — | — | — | 150 | — | — | — | — | — | — | — | — | — | — | — | — |
| Multi phase structure thermoplastic resin D | — | — | — | — | 150 | — | — | — | — | — | — | — | — | — | — | — |
| Multi phase structure thermoplastic resin F | — | — | — | — | — | 150 | — | — | — | — | — | — | — | — | — | — |
| Multi phase structure thermoplastic resin H | — | — | — | — | — | — | 150 | — | — | — | — | — | — | — | — | — |
| Multi phase structure thermoplastic resin Q | — | — | — | — | — | — | — | 150 | — | — | — | — | — | — | — | — |
| Multi phase structure thermoplastic resin d | — | — | — | — | — | — | — | — | 150 | — | — | — | — | — | — | — |
| Multi phase structure thermoplastic resin g | — | — | — | — | — | — | — | — | — | 150 | — | — | — | — | — | — |
| Low density polyethylene "RexlonF41" | — | — | — | — | — | — | — | — | — | — | 10 | 5 | 100 | — | — | — |
| High density polyethylene "StaflenE780" | — | — | — | — | — | — | — | — | — | — | — | — | — | 10 | — | — |
| Ultra high molecular weight polyethylene "LubmerL4000" | — | — | — | — | — | — | — | — | — | — | — | — | — | — | 10 | — |
| Linear low density polyethylene "LinilexAJ5310" | — | — | — | — | — | — | — | — | — | — | — | — | — | — | — | 10 |
| Dynamic friction coefficient | 0.51 | 0.45 | 0.26 | 0.27 | 0.26 | 0.25 | 0.24 | 0.28 | 0.24 | 0.25 | 0.37 | 0.42 | (*1) | 0.38 | 0.39 | 0.38 |
| Tensile Strength (kgf/mm 2) | 5.8 | 5.7 | 4.2 | 4.1 | 4.3 | 4.4 | 4.2 | 3.9 | 4.1 | 3.7 | 4.9 | 5.1 | — | 4.7 | 4.8 | 4.7 |
| Flexual modulus (kgf/mm 2) | 276 | 273 | 203 | 201 | 206 | 208 | 201 | 190 | 201 | 185 | 203 | 212 | — | 205 | 209 | 201 |
| Heat deflection temperature (°C.) | 76 | 75 | 59 | 56 | 60 | 59 | 57 | 53 | 56 | 49 | 61 | 67 | — | 61 | 63 | 60 |
| Appearance of injection mold | good | good | *A | *A | *A | *A | *A | *A | *A | *A | *B | *B | — | *C | *C | *C |

(*1) No sample was prepared because it was impossible to make a strand by extrusion.
*A: Slight layer separation was observed.
*B: Layer separation was observed.
*C: Strong layer separation was observed.

TABLE 14

(Unit is expressed by part by weight)

| | Example No. | | | | | | | | | | | | | | | |
|---|---|---|---|---|---|---|---|---|---|---|---|---|---|---|---|---|
| | | 127 | 128 | 129 | 130 | 131 | 132 | 133 | 134 | 135 | 136 | 137 | 138 | 139 | 140 | 141 | 142 |
| Polyphenylenesulfide resin | 100 | 100 | 100 | 100 | 100 | 100 | 100 | 100 | 100 | 100 | 100 | 100 | 100 | 100 | 100 | 100 |
| Multi phase structure resin A | 10 | 5 | 100 | — | — | — | — | — | — | — | — | — | — | — | — | — |
| Multi phase structure resin B | — | — | — | 10 | — | — | — | — | — | — | — | — | — | — | — | — |
| Multi phase structure resin D | — | — | — | — | 10 | — | — | — | — | — | — | — | — | — | — | — |
| Multi phase structure resin F | — | — | — | — | — | 10 | — | — | — | — | — | — | — | — | — | — |
| Multi phase structure resin H | — | — | — | — | — | — | 10 | — | — | — | — | — | — | — | — | — |
| Multi phase structure resin A' | — | — | — | — | — | — | — | 10 | — | — | — | — | — | — | — | — |
| Multi phase structure resin J | — | — | — | — | — | — | — | — | 10 | — | — | — | — | — | — | — |
| Multi phase structure resin M | — | — | — | — | — | — | — | — | — | 10 | — | — | — | — | — | — |
| Multi phase structure resin P | — | — | — | — | — | — | — | — | — | — | 10 | — | — | — | — | — |
| Multi phase structure resin Q | — | — | — | — | — | — | — | — | — | — | — | 10 | — | — | — | — |
| Multi phase structure resin V | — | — | — | — | — | — | — | — | — | — | — | — | 10 | — | — | — |
| Multi phase structure resin Y | — | — | — | — | — | — | — | — | — | — | — | — | — | 10 | — | — |
| Multi phase structure resin b | — | — | — | — | — | — | — | — | — | — | — | — | — | — | 10 | — |
| Multi phase structure resin c | — | — | — | — | — | — | — | — | — | — | — | — | — | — | — | 10 |
| Multi phase structure resin d | — | — | — | — | — | — | — | — | — | — | — | — | — | — | — | — |
| Multi phase structure resin e | — | — | — | — | — | — | — | — | — | — | — | — | — | — | — | — |
| Multi phase structure resin f | — | — | — | — | — | — | — | — | — | — | — | — | — | — | — | — |
| Multi phase structure resin g | — | — | — | — | — | — | — | — | — | — | — | — | — | — | — | — |
| Glass fiber | — | — | — | — | — | — | — | — | — | — | — | — | — | — | — | — |
| Dynamic friction coefficient | 0.21 | 0.27 | 0.23 | 0.26 | 0.24 | 0.21 | 0.24 | 0.22 | 0.24 | 0.23 | 0.25 | 0.26 | 0.26 | 0.26 | 0.20 | 0.18 |
| Tensile Strength (kgf/mm 2) | 6.3 | 6.5 | 5.8 | 6.2 | 6.4 | 6.3 | 6.2 | 6.1 | 6.0 | 6.1 | 5.9 | 5.8 | 5.8 | 5.9 | 6.3 | 6.0 |
| Flexual modulus (kgf/mm 2) | 345 | 360 | 313 | 340 | 348 | 352 | 340 | 339 | 335 | 341 | 333 | 332 | 332 | 338 | 344 | 342 |
| Heat deflection temperature | 121 | 127 | 109 | 117 | 119 | 124 | 120 | 119 | 117 | 122 | 115 | 116 | 115 | 119 | 122 | 116 |
| Appearance of injection mold | good | good | good | good | good | good | good | good | good | good | good | good | good | good | good | good |

| | Example No. | | | | | | | | | | | | |
|---|---|---|---|---|---|---|---|---|---|---|---|---|---|
| | 143 | 144 | 145 | 146 | 147 | 148 | 149 | 151 | 151 | 152 | 153 | 154 | 155 |
| Polyphenylenesulfide resin | 100 | 100 | 100 | 100 | 100 | 100 | 100 | 100 | 100 | 100 | 100 | 100 | 100 |
| Multi phase structure resin A | — | — | — | — | 10 | 10 | — | — | — | — | — | — | — |
| Multi phase structure resin B | — | — | — | — | — | — | 10 | — | — | — | — | — | — |
| Multi phase structure resin D | — | — | — | — | — | — | — | 10 | — | — | — | — | — |
| Multi phase structure resin F | — | — | — | — | — | — | — | — | 10 | — | — | — | — |
| Multi phase structure resin H | — | — | — | — | — | — | — | — | — | 10 | — | — | — |
| Multi phase structure resin A' | — | — | — | — | — | — | — | — | — | — | 10 | — | — |
| Multi phase structure resin J | — | — | — | — | — | — | — | — | — | — | — | — | — |
| Multi phase structure resin M | — | — | — | — | — | — | — | — | — | — | — | — | — |
| Multi phase structure resin P | — | — | — | — | — | — | — | — | — | — | — | — | — |
| Multi phase structure resin Q | — | — | — | — | — | — | — | — | — | — | — | — | — |
| Multi phase structure resin V | — | — | — | — | — | — | — | — | — | — | — | — | — |
| Multi phase structure resin Y | — | — | — | — | — | — | — | — | — | — | — | — | — |
| Multi phase structure resin b | — | — | — | — | — | — | — | — | — | — | — | — | — |
| Multi phase structure resin c | — | — | — | — | — | — | — | — | — | — | — | — | — |
| Multi phase structure resin d | 10 | — | — | — | — | — | — | — | — | — | — | 10 | — |
| Multi phase structure resin e | — | 10 | — | — | — | — | — | — | — | — | — | — | — |
| Multi phase structure resin f | — | — | 10 | — | — | — | — | — | — | — | — | — | — |
| Multi phase structure resin g | — | — | — | 10 | — | — | — | — | — | — | — | — | 10 |
| Glass fiber | — | — | — | — | 70 | 200 | 70 | 70 | 70 | 70 | 70 | 70 | 70 |
| Dynamic friction coefficient | 0.19 | 0.19 | 0.20 | 0.24 | 0.25 | 0.29 | 0.25 | 0.26 | 0.25 | 0.24 | 0.27 | 0.27 | 0.28 |
| Tensile Strength (kgf/mm 2) | 6.1 | 6.2 | 6.1 | 5.5 | 13.8 | 11.9 | 13.6 | 13.7 | 13.9 | 14.0 | 13.6 | 13.8 | 13.2 |
| Flexual modulus (kgf/mm 2) | 344 | 343 | 344 | 324 | 1130 | 1960 | 1105 | 1150 | 1138 | 1140 | 1129 | 1128 | 1118 |
| Heat deflection temperature | 119 | 118 | 120 | 111 | >260 | >260 | >260 | >260 | >260 | >260 | >260 | >260 | >260 |
| Appearance of injection mold | good | good | good | good | good | good | good | good | good | good | good | good | good |

TABLE 15

(Unit is expressed by part by weight)

| | Comparative Example No. | | | | | | | | | | | | | | | |
|---|---|---|---|---|---|---|---|---|---|---|---|---|---|---|---|---|
| | 66 | 67 | 68 | 69 | 70 | 71 | 72 | 73 | 74 | 75 | 76 | 77 | 78 | 79 | 80 | 81 |
| Polyphenylenesulfide rsin | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — |
| Multi phase structure thermoplastic resin B | — | — | — | 150 | — | — | — | — | — | — | — | — | — | — | — | — |
| Multi phase structure thermoplastic resin D | — | — | — | — | 150 | — | — | — | — | — | — | — | — | — | — | — |
| Multi phase structure thermoplastic resin F | — | — | — | — | — | 150 | — | — | — | — | — | — | — | — | — | — |
| Multi phase structure thermoplastic resin H | — | — | — | — | — | — | 150 | — | — | — | — | — | — | — | — | — |
| Multi phase structure thermoplastic resin Q | — | — | — | — | — | — | — | 150 | — | — | — | — | — | — | — | — |
| Multi phase structure thermoplastic resin d | — | — | — | — | — | — | — | — | 150 | — | — | — | — | — | — | — |
| Multi phase structure thermoplastic resin g | | | | | | | | | | | | | | | | |

TABLE 15-continued (Unit is expressed by part by weight)

| | Comparative Example No. | | | | | | | | | | | | | | | |
|---|---|---|---|---|---|---|---|---|---|---|---|---|---|---|---|---|
| | 66 | 67 | 68 | 69 | 70 | 71 | 72 | 73 | 74 | 75 | 76 | 77 | 78 | 79 | 80 | 81 |
| Low density polyethylene "RexlonF41" | — | — | — | — | — | — | — | — | — | — | 5 | 10 | 100 | — | — | — |
| High density polyethylene "StaflenE780" | — | — | — | — | — | — | — | — | — | — | — | — | — | 25 | — | — |
| Ultra high molecular weight polyethylene "LubmerL4000" | — | — | — | — | — | — | — | — | — | — | — | — | — | — | 25 | — |
| Linear low density polyethylene "LinilexAJ5310" | — | — | — | — | — | — | — | — | — | — | — | — | — | — | — | 25 |
| Dynamic friction coefficient | 0.62 | 0.61 | 0.29 | 0.31 | 0.29 | 0.31 | 0.29 | 0.31 | 0.26 | 0.28 | 0.41 | 0.33 | (*1) | (1*) | (*1) | 0.34 |
| Tensile Strength (kgf/mm 2) | 6.6 | 6.6 | 4.8 | 4.6 | 4.9 | 5.0 | 4.8 | 4.4 | 4.6 | 4.1 | 6.1 | 5.7 | — | — | — | 5.6 |
| Flexural modulus (kgf/mm 2) | 378 | 378 | 287 | 283 | 288 | 291 | 283 | 273 | 272 | 266 | 330 | 331 | — | — | — | 295 |
| Heat deflection temperature (°C.) | 132 | 133 | 101 | 100 | 101 | 103 | 101 | 96 | 96 | 91 | 117 | 111 | — | — | — | 110 |
| Appearance of injection mold | good | good | *A | *A | *A | *A | *A | *A | *A | *A | *B | *C | — | — | — | *C |

(*1) No sample was prepared because it was impossible to make a strand by extrusion.
*A: Slight layer separation was observed.
*B: Layer separation was observed.
*C: Strong layer separation was observed.

TABLE 16

(Unit is expressed by part by weight)

| | Example No. | | | | | | | | | | | |
|---|---|---|---|---|---|---|---|---|---|---|---|---|
| | 156 | 157 | 158 | 159 | 160 | 161 | 162 | 163 | 164 | 165 | 166 | 167 |
| Nylon 6 resin | 100 | 100 | 100 | 100 | 100 | 100 | 100 | 100 | 100 | 100 | 100 | 100 |
| Nylon 66 resin | — | — | — | — | — | — | — | — | — | — | — | — |
| Nylon MXD 6 resin | — | — | — | — | — | — | — | — | — | — | — | — |
| Multi phase structure resin A | 10 | 5 | 100 | — | — | — | — | — | — | — | — | — |
| Multi phase structure resin B | — | — | — | 10 | — | — | — | — | — | — | — | — |
| Multi phase structure resin D | — | — | — | — | 10 | — | — | — | — | — | — | — |
| Multi phase structure resin F | — | — | — | — | — | 10 | — | — | — | — | — | — |
| Multi phase structure resin H | — | — | — | — | — | — | 10 | — | — | — | — | — |
| Multi phase structure resin A' | — | — | — | — | — | — | — | 10 | — | — | — | — |
| Multi phase structure resin J | — | — | — | — | — | — | — | — | 10 | — | — | — |
| Multi phase structure resin M | — | — | — | — | — | — | — | — | — | 10 | — | — |
| Multi phase structure resin P | — | — | — | — | — | — | — | — | — | — | 10 | — |
| Multi phase structure resin Q | — | — | — | — | — | — | — | — | — | — | — | 10 |
| Multi phase structure resin V | — | — | — | — | — | — | — | — | — | — | — | — |
| Multi phase structure resin Y | — | — | — | — | — | — | — | — | — | — | — | — |
| Multi phase structure resin b | — | — | — | — | — | — | — | — | — | — | — | — |
| Multi phase structure resin c | — | — | — | — | — | — | — | — | — | — | — | — |
| Multi phase structure resin d | — | — | — | — | — | — | — | — | — | — | — | — |
| Multi phase structure resin e | — | — | — | — | — | — | — | — | — | — | — | — |
| Multi phase structure resin f | — | — | — | — | — | — | — | — | — | — | — | — |
| Multi phase structure resin g | — | — | — | — | — | — | — | — | — | — | — | — |
| Glass fiber | — | — | — | — | — | — | — | — | — | — | — | — |
| Dynamic friction coefficient | 0.22 | 0.27 | 0.25 | 0.23 | 0.23 | 0.23 | 0.24 | 0.24 | 0.23 | 0.24 | 0.29 | 0.29 |
| Tensile Strength (kgf/mm 2) | 3.5 | 3.7 | 3.1 | 3.4 | 3.6 | 3.7 | 3.5 | 3.4 | 3.3 | 3.7 | 3.3 | 3.2 |
| Flexural modulus (kgf/mm 2) | 72 | 74 | 68 | 71 | 75 | 77 | 73 | 70 | 68 | 76 | 68 | 69 |
| Heat deflection temperature | 67 | 70 | 63 | 66 | 68 | 69 | 68 | 65 | 64 | 72 | 63 | 62 |
| Appearance of injection mold | good | good | good | good | good | good | good | good | good | good | good | good |

| | Example No. | | | | | | | | | | | |
|---|---|---|---|---|---|---|---|---|---|---|---|---|
| | 168 | 169 | 170 | 171 | 172 | 173 | 174 | 175 | 176 | 177 | 178 | 179 |
| Nylon 6 resin | 100 | 100 | 100 | 100 | 100 | 100 | 100 | 100 | — | — | — | — |
| Nylon 66 resin | — | — | — | — | — | — | — | — | 100 | 100 | 100 | 100 |
| Nylon MXD 6 resin | — | — | — | — | — | — | — | — | — | — | — | — |
| Multi phase structure resin A | — | — | — | — | — | — | — | — | 10 | — | — | — |
| Multi phase structure resin B | — | — | — | — | — | — | — | — | — | 10 | — | — |
| Multi phase structure resin D | — | — | — | — | — | — | — | — | — | — | 10 | — |
| Multi phase structure resin F | — | — | — | — | — | — | — | — | — | — | — | 10 |
| Multi phase structure resin H | — | — | — | — | — | — | — | — | — | — | — | — |
| Multi phase structure resin A' | — | — | — | — | — | — | — | — | — | — | — | — |
| Multi phase structure resin J | — | — | — | — | — | — | — | — | — | — | — | — |
| Multi phase structure resin M | — | — | — | — | — | — | — | — | — | — | — | — |
| Multi phase structure resin P | — | — | — | — | — | — | — | — | — | — | — | — |
| Multi phase structure resin Q | — | — | — | — | — | — | — | — | — | — | — | — |
| Multi phase structure resin V | 10 | — | — | — | — | — | — | — | — | — | — | — |
| Multi phase structure resin Y | — | 10 | — | — | — | — | — | — | — | — | — | — |
| Multi phase structure resin b | — | — | 10 | — | — | — | — | — | — | — | — | — |
| Multi phase structure resin c | — | — | — | 10 | — | — | — | — | — | — | — | — |
| Multi phase structure resin d | — | — | — | — | 10 | — | — | — | — | — | — | — |
| Multi phase structure resin e | — | — | — | — | — | 10 | — | — | — | — | — | — |
| Multi phase structure resin f | — | — | — | — | — | — | 10 | — | — | — | — | — |
| Multi phase structure resin g | — | — | — | — | — | — | — | 10 | — | — | — | — |
| Glass fiber | — | — | — | — | — | — | — | — | 25 | 25 | 25 | 25 |

TABLE 16-continued (Unit is expressed by part by weight)

| | | | | | | | | | | | | |
|---|---|---|---|---|---|---|---|---|---|---|---|---|
| Dynamic friction coefficient | 0.25 | 0.27 | 0.21 | 0.18 | 0.19 | 0.18 | 0.18 | 0.27 | 0.27 | 0.28 | 0.26 | 0.25 |
| Tensile Strength (kgf/mm 2) | 3.1 | 3.5 | 3.5 | 3.3 | 3.4 | 3.4 | 3.4 | 3.0 | 8.7 | 8.6 | 8.8 | 8.9 |
| Flexual modulus (kgf/mm 2) | 65 | 73 | 72 | 70 | 71 | 71 | 71 | 66 | 376 | 373 | 378 | 382 |
| Heat deflection temperature | 61 | 70 | 67 | 64 | 66 | 65 | 66 | 58 | 243 | 241 | 244 | 243 |
| Appearance of injection mold | good | good | good | good | good | good | good | good | good | good | good | good |

| | Example No. | | | | | | | | | | | |
|---|---|---|---|---|---|---|---|---|---|---|---|---|
| | 180 | 181 | 182 | 183 | 184 | 185 | 186 | 187 | 188 | 189 | 190 | 191 |
| Nylon 6 resin | — | — | — | — | — | — | — | — | — | — | — | — |
| Nylon 66 resin | 100 | 100 | 100 | 100 | — | — | — | — | — | — | — | — |
| Nylon MXD 6 resin | — | — | — | — | 100 | 100 | 100 | 100 | 100 | 100 | 100 | 100 |
| Multi phase structure resin A | — | — | — | — | 10 | — | — | — | — | — | — | — |
| Multi phase structure resin B | — | — | — | — | — | 10 | — | — | — | — | — | — |
| Multi phase structure resin D | — | — | — | — | — | — | 10 | — | — | — | — | — |
| Multi phase structure resin F | — | — | — | — | — | — | — | 10 | — | — | — | — |
| Multi phase structure resin H | 10 | — | — | — | — | — | — | — | 10 | — | — | — |
| Multi phase structure resin A' | — | 10 | — | — | — | — | — | — | — | — | — | — |
| Multi phase structure resin J | — | — | — | — | — | — | — | — | — | — | — | — |
| Multi phase structure resin M | — | — | — | — | — | — | — | — | — | — | — | — |
| Multi phase structure resin P | — | — | — | — | — | — | — | — | — | — | — | — |
| Multi phase structure resin Q | — | — | — | — | — | — | — | — | — | 10 | — | — |
| Multi phase structure resin V | — | — | — | — | — | — | — | — | — | — | — | — |
| Multi phase structure resin Y | — | — | — | — | — | — | — | — | — | — | — | — |
| Multi phase structure resin b | — | — | — | — | — | — | — | — | — | — | — | — |
| Multi phase structure resin c | — | — | — | — | — | — | — | — | — | — | — | — |
| Multi phase structure resin d | — | — | 10 | — | — | — | — | — | — | — | 10 | — |
| Multi phase structure resin e | — | — | — | — | — | — | — | — | — | — | — | — |
| Multi phase structure resin f | — | — | — | — | — | — | — | — | — | — | — | — |
| Multi phase structure resin g | — | — | — | 10 | — | — | — | — | — | — | — | 10 |
| Glass fiber | 25 | 25 | 25 | 25 | — | — | — | — | — | — | — | — |
| Dynamic friction coefficient | 0.26 | 0.30 | 0.25 | 0.27 | 0.24 | 0.25 | 0.25 | 0.24 | 0.25 | 0.28 | 0.22 | 0.25 |
| Tensile Strength (kgf/mm 2) | 8.7 | 8.4 | 8.5 | 8.2 | 7.0 | 6.9 | 7.1 | 7.2 | 7.0 | 6.7 | 6.9 | 6.5 |
| Flexual modulus (kgf/mm 2) | 375 | 367 | 374 | 364 | 371 | 369 | 375 | 378 | 372 | 365 | 368 | 360 |
| Heat deflection temperature | 242 | 238 | 241 | 235 | 82 | 81 | 84 | 83 | 82 | 78 | 80 | 75 |
| Appearance of injection mold | good | good | good | good | good | good | good | good | good | good | good | good |

TABLE 17

(Unit is expressed by part by weight)

| | Comparative Example No. | | | | | | | | | | | | | | | |
|---|---|---|---|---|---|---|---|---|---|---|---|---|---|---|---|---|
| | 82 | 83 | 84 | 85 | 86 | 87 | 88 | 89 | 90 | 91 | 92 | 93 | 94 | 95 | 96 | 97 |
| Polyphenylenesulfide rsin | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — |
| Multi phase structure thermoplastic resin B | — | — | — | 150 | — | — | — | — | — | — | — | — | — | — | — | — |
| Multi phase structure thermoplastic resin D | — | — | — | — | 150 | — | — | — | — | — | — | — | — | — | — | — |
| Multi phase structure thermoplastic resin F | — | — | — | — | — | 150 | — | — | — | — | — | — | — | — | — | — |
| Multi phase structure thermoplastic resin H | — | — | — | — | — | — | 150 | — | — | — | — | — | — | — | — | — |
| Multi phase structure thermoplastic resin Q | — | — | — | — | — | — | — | — | 150 | — | — | — | — | — | — | — |
| Multi phase structure thermoplastic resin d | — | — | — | — | — | — | — | — | — | 150 | — | — | — | — | — | — |
| Multi phase structure thermoplastic resin g | — | — | — | — | — | — | — | — | — | — | 150 | — | — | — | — | — |
| Low density polyethylene "RexlonF41" | — | — | — | — | — | — | — | — | — | — | — | 10 | 5 | 100 | — | — | — |
| High density polyethylene "StaflenE780" | — | — | — | — | — | — | — | — | — | — | — | — | — | — | 10 | — | — |
| Ultra high molecular weight polyethylene "LubmerL4000" | — | — | — | — | — | — | — | — | — | — | — | — | — | — | — | 10 | — |
| Linear low density polyethylene "LinilexAJ5310" | — | — | — | — | — | — | — | — | — | — | — | — | — | — | — | — | 10 |
| Dynamic friction coefficient | 0.61 | 0.60 | 0.29 | 0.30 | 0.31 | 0.30 | 0.30 | 0.33 | 0.27 | 0.30 | 0.33 | 0.42 | (*1) | 0.34 | 0.36 | 0.35 |
| Tensile Strength (kgf/mm 2) | 4.1 | 4.1 | 2.8 | 2.7 | 2.9 | 2.9 | 2.8 | 2.5 | 2.6 | 2.2 | 2.9 | 3.3 | — | 3.0 | 3.1 | 2.8 |
| Flexual modulus (kgf/mm 2) | 76 | 76 | 64 | 63 | 66 | 67 | 63 | 60 | 62 | 56 | 63 | 66 | — | 65 | 66 | 61 |
| Heat deflection temperature (°C.) | 76 | 76 | 58 | 55 | 58 | 59 | 57 | 52 | 55 | 49 | 58 | 62 | — | 60 | 59 | 57 |
| Appearance of injection mold | good | good | *A | *A | *A | *A | *A | *A | *A | *A | *C | *B | — | *C | *C | *C |

(*1) No sample was prepared because it was impossible to make a strand by extrusion.
*A: Slight layer separation was observed.
*B: Layer separation was observed.
*C: Strong layer separation was observed.

TABLE 18

(Unit is expressed by part by weight)

| | Example No. | | | | | | | | | | | |
|---|---|---|---|---|---|---|---|---|---|---|---|---|
| | 192 | 193 | 194 | 195 | 196 | 197 | 198 | 199 | 200 | 201 | 202 | 203 |
| Modified polyphenylene ether | 100 | 100 | 100 | 100 | 100 | 100 | 100 | 100 | 100 | 100 | 100 | 100 |
| Polyphenylene ether resin | — | — | — | — | — | — | — | — | — | — | — | — |
| Multi phase structure resin C | 10 | 5 | 100 | — | — | — | — | — | — | — | — | — |
| Multi phase structure resin A | — | — | — | 10 | — | — | — | — | — | — | — | — |
| Multi phase structure resin E | — | — | — | — | 10 | — | — | — | — | — | — | — |
| Multi phase structure resin G | — | — | — | — | — | 10 | — | — | — | — | — | — |
| Multi phase structure resin I | — | — | — | — | — | — | 10 | — | — | — | — | — |
| Multi phase structure resin C' | — | — | — | — | — | — | — | 10 | — | — | — | — |
| Multi phase structure resin L | — | — | — | — | — | — | — | — | 10 | — | — | — |
| Multi phase structure resin O | — | — | — | — | — | — | — | — | — | 10 | — | — |
| Multi phase structure resin T | — | — | — | — | — | — | — | — | — | — | 10 | — |
| Multi phase structure resin U | — | — | — | — | — | — | — | — | — | — | — | 10 |
| Multi phase structure resin X | — | — | — | — | — | — | — | — | — | — | — | — |
| Multi phase structure resin a | — | — | — | — | — | — | — | — | — | — | — | — |
| Multi phase structure resin b | — | — | — | — | — | — | — | — | — | — | — | — |
| Multi phase structure resin c | — | — | — | — | — | — | — | — | — | — | — | — |
| Multi phase structure resin d | — | — | — | — | — | — | — | — | — | — | — | — |
| Multi phase structure resin e | — | — | — | — | — | — | — | — | — | — | — | — |
| Multi phase structure resin f | — | — | — | — | — | — | — | — | — | — | — | — |
| Multi phase structure resin i | — | — | — | — | — | — | — | — | — | — | — | — |
| Glass fiber | — | — | — | — | — | — | — | — | — | — | — | — |
| Dynamic friction coefficient | 0.20 | 0.29 | 0.23 | 0.22 | 0.20 | 0.19 | 0.21 | 0.22 | 0.22 | 0.21 | 0.24 | 0.25 |
| Tensile Strength (kgf/mm 2) | 6.2 | 6.3 | 5.8 | 6.1 | 6.3 | 6.3 | 6.2 | 6.1 | 6.0 | 6.1 | 5.9 | 5.8 |
| Flexual modulus (kgf/mm 2) | 240 | 244 | 220 | 242 | 245 | 247 | 238 | 235 | 234 | 238 | 231 | 228 |
| Heat deflection temperature | 118 | 120 | 110 | 119 | 120 | 122 | 117 | 116 | 115 | 119 | 113 | 111 |
| Appearance of injection mold | good | good | good | good | good | good | good | good | good | good | good | good |

| | Example No. | | | | | | | | | | | |
|---|---|---|---|---|---|---|---|---|---|---|---|---|
| | 204 | 205 | 206 | 207 | 208 | 209 | 210 | 211 | 212 | 213 | 214 | 215 |
| Modified polyphenylene ether | 100 | 100 | 100 | 100 | 100 | 100 | 100 | 100 | 100 | 100 | 100 | 100 |
| Polyphenylene ether resin | — | — | — | — | — | — | — | — | — | — | — | — |
| Multi phase structure resin C | — | — | — | — | — | — | — | — | 10 | — | — | — |
| Multi phase structure resin A | — | — | — | — | — | — | — | — | — | 10 | — | — |
| Multi phase structure resin E | — | — | — | — | — | — | — | — | — | — | 10 | — |
| Multi phase structure resin G | — | — | — | — | — | — | — | — | — | — | — | 10 |
| Multi phase structure resin I | — | — | — | — | — | — | — | — | — | — | — | — |
| Multi phase structure resin C' | — | — | — | — | — | — | — | — | — | — | — | — |
| Multi phase structure resin L | — | — | — | — | — | — | — | — | — | — | — | — |
| Multi phase structure resin O | — | — | — | — | — | — | — | — | — | — | — | — |
| Multi phase structure resin T | — | — | — | — | — | — | — | — | — | — | — | — |
| Multi phase structure resin U | — | — | — | — | — | — | — | — | — | — | — | — |
| Multi phase structure resin X | 10 | — | — | — | — | — | — | — | — | — | — | — |
| Multi phase structure resin a | — | 10 | — | — | — | — | — | — | — | — | — | — |
| Multi phase structure resin b | — | — | 10 | — | — | — | — | — | — | — | — | — |
| Multi phase structure resin c | — | — | — | 10 | — | — | — | — | — | — | — | — |
| Multi phase structure resin d | — | — | — | — | 10 | — | — | — | — | — | — | — |
| Multi phase structure resin e | — | — | — | — | — | 10 | — | — | — | — | — | — |
| Multi phase structure resin f | — | — | — | — | — | — | 10 | — | — | — | — | — |
| Multi phase structure resin i | — | — | — | — | — | — | — | 10 | — | — | — | — |
| Glass fiber | — | — | — | — | — | — | — | — | 25 | 25 | 25 | 25 |
| Dynamic friction coefficient | 0.26 | 0.25 | 0.21 | 0.17 | 0.19 | 0.18 | 0.18 | 0.23 | 0.26 | 0.24 | 0.26 | 0.25 |
| Tensile Strength (kgf/mm 2) | 5.8 | 5.9 | 6.1 | 5.8 | 5.9 | 6.0 | 6.0 | 5.6 | 10.0 | 9.9 | 10.2 | 10.1 |
| Flexual modulus (kgf/mm 2) | 229 | 234 | 242 | 235 | 237 | 237 | 238 | 224 | 495 | 496 | 498 | 498 |
| Heat deflection temperature | 112 | 116 | 118 | 111 | 114 | 114 | 115 | 106 | 131 | 120 | 133 | 132 |
| Appearance of injection mold | good | good | good | good | good | good | good | good | good | good | good | good |

| | Example No. | | | | | | | | | | | |
|---|---|---|---|---|---|---|---|---|---|---|---|---|
| | 216 | 217 | 218 | 219 | 220 | 221 | 222 | 223 | 224 | 225 | 226 | 227 |
| Modified polyphenylene ether | 100 | 100 | 100 | 100 | — | — | — | — | — | — | — | — |
| Polyphenylene ether resin | — | — | — | — | 100 | 100 | 100 | 100 | 100 | 100 | 100 | 100 |
| Multi phase structure resin C | — | — | — | — | 10 | — | — | — | — | — | — | — |
| Multi phase structure resin A | — | — | — | — | — | 10 | — | — | — | — | — | — |
| Multi phase structure resin E | — | — | — | — | — | — | 10 | — | — | — | — | — |
| Multi phase structure resin G | — | — | — | — | — | — | — | 10 | — | — | — | — |
| Multi phase structure resin I | 10 | — | — | — | — | — | — | — | 10 | — | — | — |
| Multi phase structure resin C' | — | 10 | — | — | — | — | — | — | — | 10 | — | — |
| Multi phase structure resin L | — | — | — | — | — | — | — | — | — | — | — | — |
| Multi phase structure resin O | — | — | — | — | — | — | — | — | — | — | — | — |
| Multi phase structure resin T | — | — | — | — | — | — | — | — | — | — | — | — |
| Multi phase structure resin U | — | — | — | — | — | — | — | — | — | — | — | — |
| Multi phase structure resin X | — | — | — | — | — | — | — | — | — | — | — | — |
| Multi phase structure resin a | — | — | — | — | — | — | — | — | — | — | — | — |
| Multi phase structure resin b | — | — | — | — | — | — | — | — | — | — | — | — |
| Multi phase structure resin c | — | — | — | — | — | — | — | — | — | — | — | — |
| Multi phase structure resin d | — | — | 10 | — | — | — | — | — | — | — | 10 | — |
| Multi phase structure resin e | — | — | — | — | — | — | — | — | — | — | — | — |
| Multi phase structure resin f | — | — | — | — | — | — | — | — | — | — | — | — |
| Multi phase structure resin i | — | — | — | 10 | — | — | — | — | — | — | — | 10 |

TABLE 18-continued (Unit is expressed by part by weight)

| | | | | | | | | | | | | |
|---|---|---|---|---|---|---|---|---|---|---|---|---|
| Glass fiber | 25 | 25 | 25 | 25 | — | — | — | — | — | — | — | — |
| Dynamic friction coefficient | 0.27 | 0.28 | 0.23 | 0.30 | 0.22 | 0.24 | 0.21 | 0.20 | 0.22 | 0.21 | 0.20 | 0.22 |
| Tensile Strength (kgf/mm 2) | 10.0 | 9.9 | 9.9 | 9.5 | 7.5 | 7.6 | 7.7 | 7.6 | 7.7 | 7.3 | 7.3 | 7.0 |
| Flexual modulus (kgf/mm 2) | 496 | 493 | 494 | 478 | 261 | 263 | 265 | 268 | 259 | 257 | 258 | 252 |
| Heat deflection temperature | 129 | 128 | 128 | 125 | 159 | 160 | 159 | 161 | 157 | 155 | 157 | 154 |
| Appearance of injection mold | good | good | good | good | good | good | good | good | good | good | good | good |

TABLE 19

(Unit is expressed by part by weight)

| | Comparative Example No. | | | | | | | | | | | | | | | |
|---|---|---|---|---|---|---|---|---|---|---|---|---|---|---|---|---|
| | 98 | 99 | 100 | 101 | 102 | 103 | 104 | 105 | 106 | 107 | 108 | 109 | 110 | 111 | 112 | 113 |
| Modified polyphenylene ether | 100 | 100 | 100 | 100 | 100 | 100 | 100 | 100 | 100 | 100 | 100 | 100 | 100 | 100 | 100 | 100 |
| Multi phase structure thermoplastic resin C | — | 0.1 | 150 | — | — | — | — | — | — | — | — | — | — | — | — | — |
| Multi phase structure thermoplastic resin A | — | — | — | 150 | — | — | — | — | — | — | — | — | — | — | — | — |
| Multi phase structure thermoplastic resin E | — | — | — | — | 150 | — | — | — | — | — | — | — | — | — | — | — |
| Multi phase structure thermoplastic resin G | — | — | — | — | — | 150 | — | — | — | — | — | — | — | — | — | — |
| Multi phase structure thermoplastic resin I | — | — | — | — | — | — | 150 | — | — | — | — | — | — | — | — | — |
| Multi phase structure thermoplastic resin U | — | — | — | — | — | — | — | 150 | — | — | — | — | — | — | — | — |
| Multi phase structure thermoplastic resin d | — | — | — | — | — | — | — | — | 150 | — | — | — | — | — | — | — |
| Multi phase structure thermoplastic resin g | — | — | — | — | — | — | — | — | — | 150 | — | — | — | — | — | — |
| Low density polyethylene "RexlonF41" | — | — | — | — | — | — | — | — | — | — | 10 | 5 | 100 | — | — | — |
| High density polyethylene "StaflenE780" | — | — | — | — | — | — | — | — | — | — | — | — | — | 10 | — | — |
| Ultra high molecular weight polyethylene "LubmerL4000" | — | — | — | — | — | — | — | — | — | — | — | — | — | — | 10 | — |
| Linear low density polyethylene "LinilexAJ5310" | — | — | — | — | — | — | — | — | — | — | — | — | — | — | — | 10 |
| Dynamic friction coefficient | 0.65 | 0.65 | 0.29 | 0.30 | 0.31 | 0.31 | 0.32 | 0.35 | 0.26 | 0.30 | 0.37 | 0.51 | (*1) | (*1) | (*1) | 0.39 |
| Tensile Strength (kgf/mm 2) | 6.5 | 6.5 | 5.4 | 5.3 | 5.5 | 5.5 | 5.4 | 5.1 | 5.0 | 4.8 | 5.4 | 5.6 | — | — | — | 5.3 |
| Flexual modulus (kgf/mm 2) | 251 | 250 | 205 | 203 | 206 | 207 | 204 | 194 | 197 | 190 | 218 | 224 | — | — | — | 214 |
| Heat deflection temperature (°C.) | 129 | 128 | 99 | 98 | 100 | 101 | 99 | 95 | 95 | 90 | 83 | 86 | — | — | — | 82 |
| Appearance of injection mold | good | good | *A | *A | *A | *A | *A | *A | *A | *A | *C | *B | — | — | — | *C |

(*1) No sample was prepared because it was impossible to make a strand by extrusion.
*A: Slight layer separation was observed.
*B: Layer separation was observed.
*C: Strong layer separation was observed.

TABLE 20

(Unit is expressed by part by weight)

| | Example No. | | | | | | | | | | | | | |
|---|---|---|---|---|---|---|---|---|---|---|---|---|---|---|
| | 228 | 229 | 230 | 231 | 232 | 233 | 234 | 235 | 236 | 237 | 238 | 239 | 240 | 241 |
| Polyalylate resin | 100 | 100 | 100 | 100 | 100 | 100 | 100 | 100 | 100 | 100 | 100 | 100 | 100 | 100 |
| Multi phase structure resin A | 10 | 5 | 100 | — | — | — | — | — | — | — | — | — | — | — |
| Multi phase structure resin C | — | — | — | 10 | — | — | — | — | — | — | — | — | — | — |
| Multi phase structure resin D | — | — | — | — | 10 | — | — | — | — | — | — | — | — | — |
| Multi phase structure resin F | — | — | — | — | — | 10 | — | — | — | — | — | — | — | — |
| Multi phase structure resin H | — | — | — | — | — | — | 10 | — | — | — | — | — | — | — |
| Multi phase structure resin A' | — | — | — | — | — | — | — | 10 | — | — | — | — | — | — |
| Multi phase structure resin J | — | — | — | — | — | — | — | — | 10 | — | — | — | — | — |
| Multi phase structure resin M | — | — | — | — | — | — | — | — | — | 10 | — | — | — | — |
| Multi phase structure resin P | — | — | — | — | — | — | — | — | — | — | 10 | — | — | — |
| Multi phase structure resin Q | — | — | — | — | — | — | — | — | — | — | — | 10 | — | — |
| Multi phase structure resin V | — | — | — | — | — | — | — | — | — | — | — | — | 10 | — |
| Multi phase structure resin Y | — | — | — | — | — | — | — | — | — | — | — | — | — | 10 |
| Multi phase structure resin b | — | — | — | — | — | — | — | — | — | — | — | — | — | — |
| Multi phase structure resin c | — | — | — | — | — | — | — | — | — | — | — | — | — | — |
| Multi phase structure resin d | — | — | — | — | — | — | — | — | — | — | — | — | — | — |
| Multi phase structure resin e | — | — | — | — | — | — | — | — | — | — | — | — | — | — |
| Multi phase structure resin f | — | — | — | — | — | — | — | — | — | — | — | — | — | — |
| Multi phase structure resin g | — | — | — | — | — | — | — | — | — | — | — | — | — | — |
| Glass fiber | — | — | — | — | — | — | — | — | — | — | — | — | — | — |
| Dynamic friction coefficient | 0.21 | 0.25 | 0.23 | 0.22 | 0.20 | 0.20 | 0.22 | 0.23 | 0.23 | 0.21 | 0.24 | 0.25 | 0.26 | 0.25 |
| Tensile Strength (kgf/mm 2) | 6.7 | 6.8 | 6.3 | 6.6 | 6.7 | 6.7 | 6.6 | 6.6 | 6.6 | 6.7 | 6.5 | 6.4 | 6.5 | 6.5 |
| Flexual modulus (kgf/mm 2) | 182 | 186 | 179 | 178 | 184 | 186 | 180 | 177 | 180 | 184 | 178 | 177 | 176 | 178 |
| Heat deflection temperature | 161 | 165 | 155 | 159 | 162 | 163 | 160 | 162 | 158 | 163 | 155 | 152 | 155 | 156 |

TABLE 20-continued (Unit is expressed by part by weight)

| | | | | | | | | | | | | | | |
|---|---|---|---|---|---|---|---|---|---|---|---|---|---|---|
| Appearance of injection mold | good | good | good | good | good | good | good | good | good | good | good | good | good | good |

| | Example No. | | | | | | | | | | | | | |
|---|---|---|---|---|---|---|---|---|---|---|---|---|---|---|
| | 242 | 243 | 244 | 245 | 246 | 247 | 248 | 249 | 250 | 251 | 252 | 253 | 254 | 255 |
| Polyalylate resin | 100 | 100 | 100 | 100 | 100 | 100 | 100 | 100 | 100 | 100 | 100 | 100 | 100 | 100 |
| Multi phase structure resin A | — | — | — | — | — | — | 10 | — | — | — | — | — | — | — |
| Multi phase structure resin C | — | — | — | — | — | — | — | 10 | — | — | — | — | — | — |
| Multi phase structure resin D | — | — | — | — | — | — | — | — | 10 | — | — | — | — | — |
| Multi phase structure resin F | — | — | — | — | — | — | — | — | — | 10 | — | — | — | — |
| Multi phase structure resin H | — | — | — | — | — | — | — | — | — | — | 10 | — | — | — |
| Multi phase structure resin A' | — | — | — | — | — | — | — | — | — | — | — | 10 | — | — |
| Multi phase structure resin J | — | — | — | — | — | — | — | — | — | — | — | — | — | — |
| Multi phase structure resin M | — | — | — | — | — | — | — | — | — | — | — | — | — | — |
| Multi phase structure resin P | — | — | — | — | — | — | — | — | — | — | — | — | — | — |
| Multi phase structure resin Q | — | — | — | — | — | — | — | — | — | — | — | — | — | — |
| Multi phase structure resin V | — | — | — | — | — | — | — | — | — | — | — | — | — | — |
| Multi phase structure resin Y | — | — | — | — | — | — | — | — | — | — | — | — | — | — |
| Multi phase structure resin b | 10 | — | — | — | — | — | — | — | — | — | — | — | — | — |
| Multi phase structure resin c | — | 10 | — | — | — | — | — | — | — | — | — | — | — | — |
| Multi phase structure resin d | — | — | 10 | — | — | — | — | — | — | — | — | — | 10 | — |
| Multi phase structure resin e | — | — | — | 10 | — | — | — | — | — | — | — | — | — | — |
| Multi phase structure resin f | — | — | — | — | 10 | — | — | — | — | — | — | — | — | — |
| Multi phase structure resin g | — | — | — | — | — | 10 | — | — | — | — | — | — | — | 10 |
| Glass fiber | — | — | — | — | — | — | 43 | 43 | 43 | 43 | 43 | 43 | 43 | 43 |
| Dynamic friction coefficient | 0.20 | 0.16 | 0.18 | 0.19 | 0.17 | 0.23 | 0.26 | 0.29 | 0.27 | 0.28 | 0.27 | 0.30 | 0.23 | 0.32 |
| Tensile Strength (kgf/mm 2) | 6.7 | 6.4 | 6.5 | 6.5 | 6.5 | 6.1 | 13.0 | 12.9 | 13.1 | 13.0 | 12.9 | 12.8 | 12.9 | 12.4 |
| Flexual modulus (kgf/mm 2) | 182 | 177 | 179 | 180 | 179 | 172 | 560 | 555 | 562 | 559 | 557 | 553 | 559 | 550 |
| Heat deflection temperature | 161 | 156 | 158 | 158 | 157 | 148 | 167 | 164 | 168 | 168 | 166 | 163 | 166 | 157 |
| Appearance of injection mold | good | good | good | good | good | good | good | good | good | good | good | good | good | good |

TABLE 21

(Unit is expressed by part by weight)

| | Comparative Example No. | | | | | | | | | | | | | | | |
|---|---|---|---|---|---|---|---|---|---|---|---|---|---|---|---|---|
| | 114 | 115 | 116 | 117 | 118 | 119 | 120 | 121 | 122 | 123 | 124 | 125 | 126 | 127 | 128 | 129 |
| Polyalylate resin | 100 | 100 | 100 | 100 | 100 | 100 | 100 | 100 | 100 | 100 | 100 | 100 | 100 | 100 | 100 | 100 |
| Multi phase structure thermoplastic resin A | — | 0.1 | 150 | — | — | — | — | — | — | — | — | — | — | — | — | — |
| Multi phase structure thermoplastic resin C | — | — | — | 150 | — | — | — | — | — | — | — | — | — | — | — | — |
| Multi phase structure thermoplastic resin D | — | — | — | — | 150 | — | — | — | — | — | — | — | — | — | — | — |
| Multi phase structure thermoplastic resin F | — | — | — | — | — | 150 | — | — | — | — | — | — | — | — | — | — |
| Multi phase structure thermoplastic resin H | — | — | — | — | — | — | 150 | — | — | — | — | — | — | — | — | — |
| Multi phase structure thermoplastic resin Q | — | — | — | — | — | — | — | 150 | — | — | — | — | — | — | — | — |
| Multi phase structure thermoplastic resin d | — | — | — | — | — | — | — | — | 150 | — | — | — | — | — | — | — |
| Multi phase structure thermoplastic resin g | — | — | — | — | — | — | — | — | — | 150 | — | — | — | — | — | — |
| Low density polyethylene "RexlonF41" | — | — | — | — | — | — | — | — | — | — | 10 | 5 | 100 | — | — | — |
| High density polyethylene "StaflenE780" | — | — | — | — | — | — | — | — | — | — | — | — | — | 10 | — | — |
| Ultra high molecular weight polyethylene "LubmerL4000" | — | — | — | — | — | — | — | — | — | — | — | — | — | — | 10 | — |
| Linear low density polyethylene "LinilexAJ5310" | — | — | — | — | — | — | — | — | — | — | — | — | — | — | — | 10 |
| Dynamic friction coefficient | 0.63 | 0.62 | 0.29 | 0.31 | 0.29 | 0.31 | 0.29 | 0.33 | 0.27 | 0.30 | 0.37 | 0.41 | (*1) | (*1) | (*1) | 0.39 |
| Tensile Strength (kgf/mm 2) | 7.1 | 7.1 | 5.8 | 5.7 | 5.8 | 5.8 | 5.7 | 5.5 | 5.6 | 5.3 | 5.5 | 5.7 | — | — | — | 5.4 |
| Flexual modulus (kgf/mm 2) | 190 | 189 | 172 | 168 | 171 | 170 | 166 | 166 | 169 | 162 | 158 | 162 | — | — | — | 155 |
| Heat deflection temperature (°C.) | 178 | 178 | 142 | 140 | 141 | 142 | 176 | 136 | 140 | 133 | 145 | 151 | — | — | — | 143 |
| Appearance of injection mold | good | good | *A | *A | *A | *A | *A | *A | *A | *A | *C | *B | — | — | — | *C |

(*1) No sample was prepared because it was impossible to make a strand by extrusion.
*A: Slight layer separation was observed.
*B: Layer separation was observed.
*C: Strong layer separation was observed.

What we claim is:

1. A method of improving the sliding property of a thermoplastic resin selected from the group consisting of a polyoxymethylene resin, a polycarbonate resin, a styrene resin, a polyester resin, a polyarylene sulfide resin, a polyamide resin, a polyphenylene ether resin, a polyarylate resin and mixtures thereof, said method comprising the steps of adding 0.1–50% by weight of a lubricating material and 0.1–50% by weight of sliding property improving agent, said agent comprising a multiphase structure thermoplastic resin made of a graft copolymer which consists of from 5 to 95 parts by weight of an ethylene polymer (a) and from 95 to 5 parts by weight of a vinyl polymer (b) formed from a monomer selected from the group consisting of an aromatic vinyl monomer, an acrylic acid ester monomer, a methacrylic acid ester monomer, a vinyl cyanide monomer, a vinyl ester monomer and mixtures thereof, said vinyl polymer (b) having a mean number degree of polymerization of from 10 to 5,000, one of ethylene polymer (a) and vinyl polymer (b) being a dispersed polymer and the other being a dispersing polymer.

2. The method of claim 1, wherein said lubricating material is selected from the group consisting of fatty acids, alcohols, fatty acid esters, silicones, mineral oils and mixtures thereof.

3. The method of claim 1, wherein said multiphase thermoplastic resin is obtained by a process comprising the steps of:

(1) adding a vinyl monomer, a radical polymerizable organic peroxide and a radical polymerization initiator to a water suspension of an ethylene polymer to form a resultant mixture;

(2) impregnating said ethylene polymer with said vinyl monomer, radical polymerizable organic peroxide and radical polymerization initiator by heating the resultant mixture;

(3) raising the temperature of the resultant mixture until more than 10% by weight of the vinyl monomer and radical polymerizable organic peroxide is impregnated inside of said ethylene polymer;

(4) copolymerizing said vinyl monomer and radical polymerizable organic peroxide inside of said ethylene polymer to produce a graft precursor; and (5) melting and kneading the graft precursor at a temperature of from 100°–300° C. to obtain said multiphase thermoplastic resin.

* * * * *

UNITED STATES PATENT AND TRADEMARK OFFICE
CERTIFICATE OF CORRECTION

PATENT NO. : 5 314 912
DATED : May 24, 1994
INVENTOR(S) : Shouichi YOSHITANI, et al It is certified that error appears in the above-indentified patent and that said Letters Patent is hereby corrected as shown below:

```
On the title page, item [57];
    change "anti-brasion" to ---anti-abrasion---.
```

Signed and Sealed this

Eleventh Day of October, 1994

Attest:

BRUCE LEHMAN

*Attesting Officer*          *Commissioner of Patents and Trademarks*